(12) United States Patent
Hashimoto

(10) Patent No.: US 8,675,302 B2
(45) Date of Patent: Mar. 18, 2014

(54) CARTRIDGE MAGAZINE FOR LIBRARY SYSTEM AND LIBRARY SYSTEM WITH CARTRIDGE THEFT PREVENTION MECHANISM

(75) Inventor: Koujiro Hashimoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/560,729

(22) Filed: Jul. 27, 2012

(65) Prior Publication Data

US 2012/0286633 A1 Nov. 15, 2012

Related U.S. Application Data

(63) Continuation of application No. PCT/JP2010/051164, filed on Jan. 28, 2010.

(51) Int. Cl.
*G11B 15/68* (2006.01)
*G11B 23/023* (2006.01)
*G11B 33/04* (2006.01)

(52) U.S. Cl.
USPC .......................................................... 360/92.1

(58) Field of Classification Search
USPC .......................................................... 360/92.1
See application file for complete search history.

(56) References Cited

FOREIGN PATENT DOCUMENTS

| JP | 5-96929 | 12/1993 |
|---|---|---|
| JP | 6-19146 | 3/1994 |
| JP | 11-185330 | 7/1999 |
| JP | 2002-528842 | 9/2002 |
| JP | 2005-317056 | 11/2005 |
| JP | 2008-210474 | 9/2008 |
| WO | 00/25311 | 5/2000 |

OTHER PUBLICATIONS

International Search Report of PCT/JP2010/051164 mailed Apr. 13, 2010.

*Primary Examiner* — Craig A. Renner
(74) *Attorney, Agent, or Firm* — Staas & Halsey LLP

(57) ABSTRACT

A library system which is provided with a cartridge magazine which stores a plurality of cartridges and enables cartridges to be taken out of and inserted into the library system, a key lock mechanism which prevents takeout of a cartridge by a key, and a key and a takeout lock mechanism of the cartridge magazine in the library system, wherein when a key locked cartridge magazine is loaded into the library system, a robot inside of the library system is used to operate the key to disengage the key lock of the cartridge magazine and lock takeout from the library system.

20 Claims, 18 Drawing Sheets

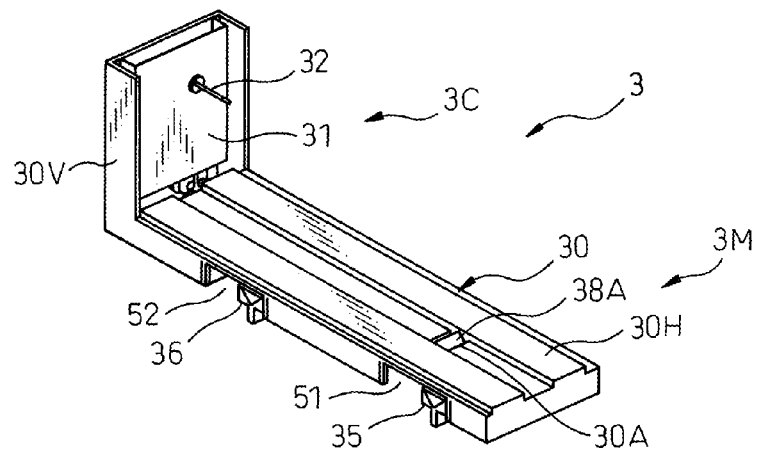
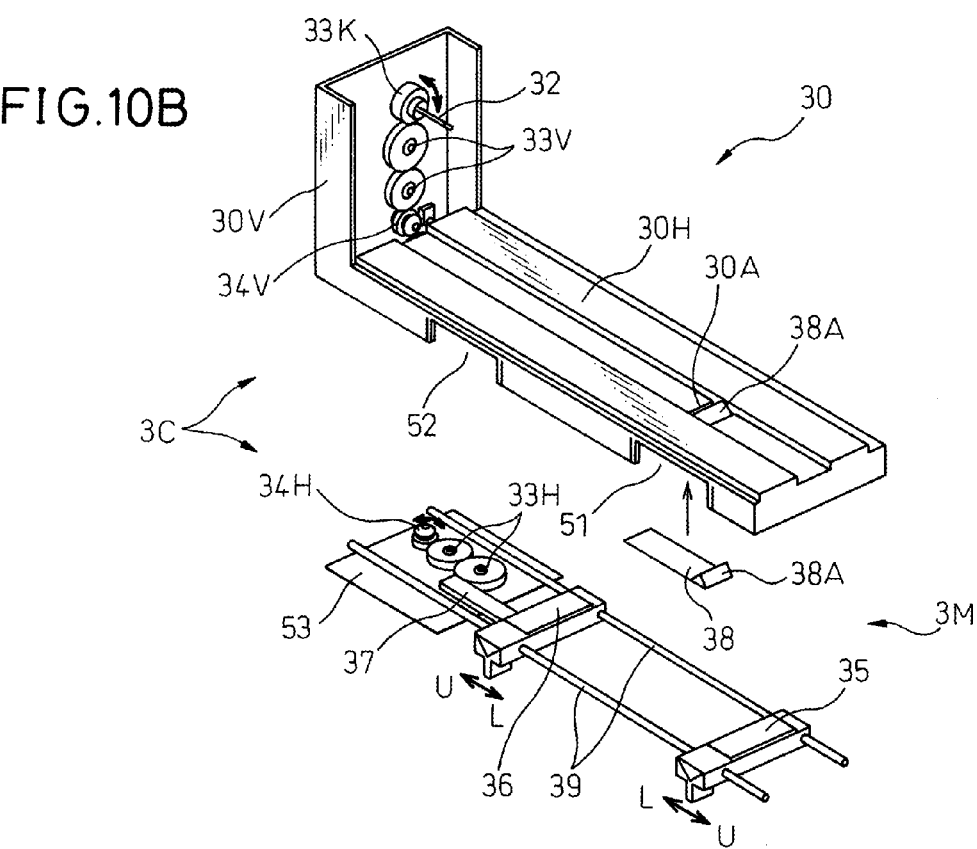

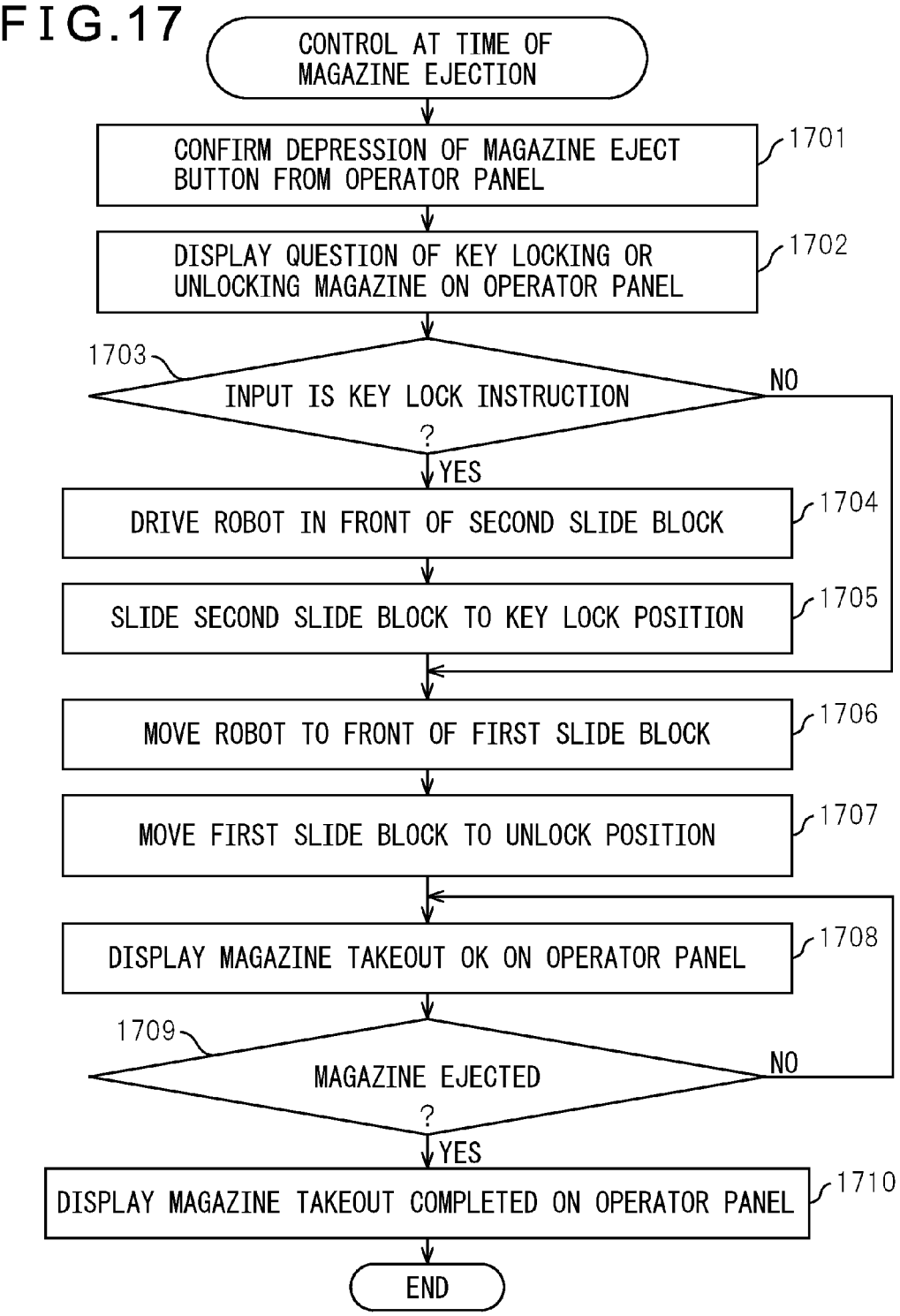

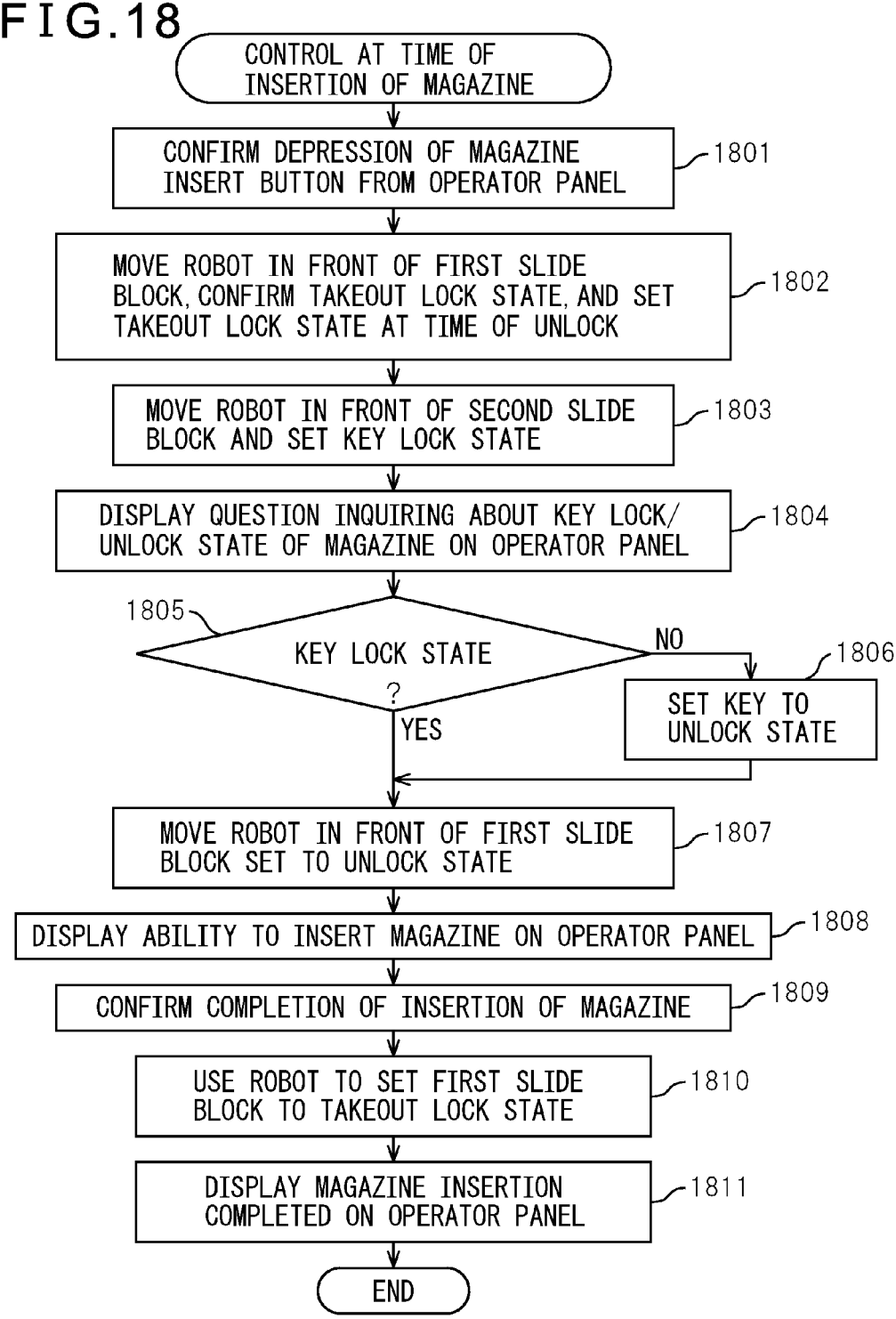

CARTRIDGE MAGAZINE FOR LIBRARY SYSTEM AND LIBRARY SYSTEM WITH CARTRIDGE THEFT PREVENTION MECHANISM

CROSS-REFERENCE TO RELATED APPLICATION

This application is a continuation application based upon and claims priority of International Application No. PCT/JP2010/051164, filed on Jan. 28, 2010, the contents of which being incorporated herein by reference.

FIELD

The present application relates to a cartridge magazine for a library system and to a library system. In the embodiment which is explained below, a key lock magazine with a cartridge withdrawal prevention function which prevents withdrawal of a cartridge by using a key will be explained for a cartridge magazine which holds a plurality of magnetic tape cartridges which are used for a tape library system and is stored externally. Further, a library system will be explained where when this key lock magazine is inserted into the library system, the cartridge lock by the key is disengaged and use of a cartridge inside the key lock magazine is enabled.

BACKGROUND

In the past, as a large capacity storage system which is used connected to a large-sized computer system, a library system has been known which holds a large number of cartridges in which magnetic tape media are housed and which transports these cartridges by a transport mechanism to a tape drive where data is read and written from and to the tape media. In recent years, there have been library systems which are provided with a plurality of tape drives and library systems which are provided with optical disk drives.

In such a library system, when exchanging cartridges which are stored in the system, the cartridges are not exchanged one by one. They are exchanged in units of cartridge magazines each which may hold a plurality of cartridge. Such cartridge magazines facilitate takeout and insertion of cartridges from and to the library system. However, when taking out a cartridge magazine from the library system for storage and transport, a cartridge may drop out from the cartridge magazine. Further, when taking out a cartridge magazine from the library system for storage and transport, a third party may steal a cartridge by withdrawal of the cartridge from the cartridge magazine. This is an issue security wise.

Therefore, when storing and transporting a cartridge magazine which is taken out from the library system, the cartridge magazine is often placed in a case with a key so that a cartridge which is held inside is not stolen. (For example, see Japanese Laid-Open Patent Publication No. 2008-210474.)

However, when placing a cartridge magazine which is taken out from the library system into a case equipped with a key, it is necessary to carry around the key along with the case. If the key is lost, there is the problem that the cartridge magazine may no longer be taken out from the case. That is, the conventional cartridge magazine had the issue of the complexity of the work for preventing the held cartridges from being stolen.

SUMMARY

In one aspect, the present application provides a cartridge magazine for a library system excellent in security which may be taken out from a library system and may hold a plurality of cartridges inside it, which cartridge magazine may automatically prevent removal of a cartridge at the time of being taken out from the library system and thereby may prevent theft of a cartridge which is held in the taken out cartridge magazine and enables free withdrawal of a cartridge which is held inside at the inside of the library system by automatic disengagement of the withdrawal prevention function of the cartridge when the cartridge magazine is inserted into the library system in a cartridge lock state.

Further, in another aspect, the present application provides a library system which automatically disengages the withdrawal prevention function of a cartridge from the cartridge magazine at the library side so as to enable a cartridge which is held in the cartridge magazine to be freely withdrawn inside of the library system and conveyed by a conveyance device even when a cartridge magazine with cartridges in a withdrawal prevention state is loaded into the library system.

According to one embodiment, the cartridge magazine of the present application is a cartridge magazine for a library system which is provided with a cartridge storage cell assembly which is provided with a plurality of cells which may hold cartridges, a cartridge lock mechanism which prevents a cartridge which is stored in a cell from being taken out from the cell, a drive mechanism of a cartridge lock mechanism which is provided with a key insertion hole in which a key may be inserted and which uses rotation of a key which is inserted into the key insertion hole so as to drive the cartridge lock mechanism, and a housing which holds the cartridge storage cell assembly, cartridge lock mechanism, and drive mechanism of the cartridge lock mechanism, the key insertion hole being positioned at the side surface of the housing at the side for insertion into the library system in the state where the drive mechanism of the cartridge lock mechanism is held in the housing.

Further, according to another aspect, the library system of the present application is provided with at least one cartridge magazine which is provided with a plurality of cells which may store cartridges and which may be taken out of and inserted into the library system, a holder which holds the cartridge magazine in the library system, storage cells which may store cartridges inside the library system, at least one tape drive which may read and write data from and to a magnetic tape in the cartridge, a robot which conveys the cartridge among the cartridge magazine, storage cells, and tape drives, and a controller which controls the operation of the library system, the cartridge magazine provided with a key lock mechanism which uses a key to prevent withdrawal of a stored cartridge, the holder provided with a key which engages with the key lock mechanism, and the key driven by the robot which is controlled by the controller.

In this case, the cartridge magazine is provided with a cartridge storage cell assembly which is provided with a plurality of cells which may hold cartridges, a key lock mechanism, and a housing which holds the cartridge storage cell assembly and the key lock mechanism, the key lock mechanism is provided with a cartridge lock mechanism which prevents a cartridge which is stored in a cell from being taken out from the cell and a drive mechanism of a cartridge lock mechanism which is provided with a key insertion hole in which a key may be inserted and which uses rotation of a key which is inserted into the key insertion hole to drive the cartridge lock mechanism, and the key insertion hole is positioned at the side surface of the housing at the side for insertion into the library system in the state where the drive mechanism of the cartridge lock mechanism is held in the housing.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 8C is a partial enlarged perspective view which illustrates the key lock state where lock plates which were illustrated in FIG. 8B move to a lock position and a cartridge may not be taken out in.

FIG. 10A is a perspective view which illustrates a magazine holder which is illustrated in FIG. 3A in brief.

FIG. 10B is a disassembled perspective view which illustrates the configuration of the magazine holder of FIG. 10A.

FIG. 17 is a flow chart which illustrates a control routine at the time of ejection of a cartridge magazine which is performed by the controller which is illustrated in FIG. 2B.

FIG. 18 is a flow chart which illustrates a control routine at the time of insertion of a cartridge magazine which is performed by the controller which is illustrated in FIG. 2B.

DESCRIPTION OF EMBODIMENTS

Figure 1A:
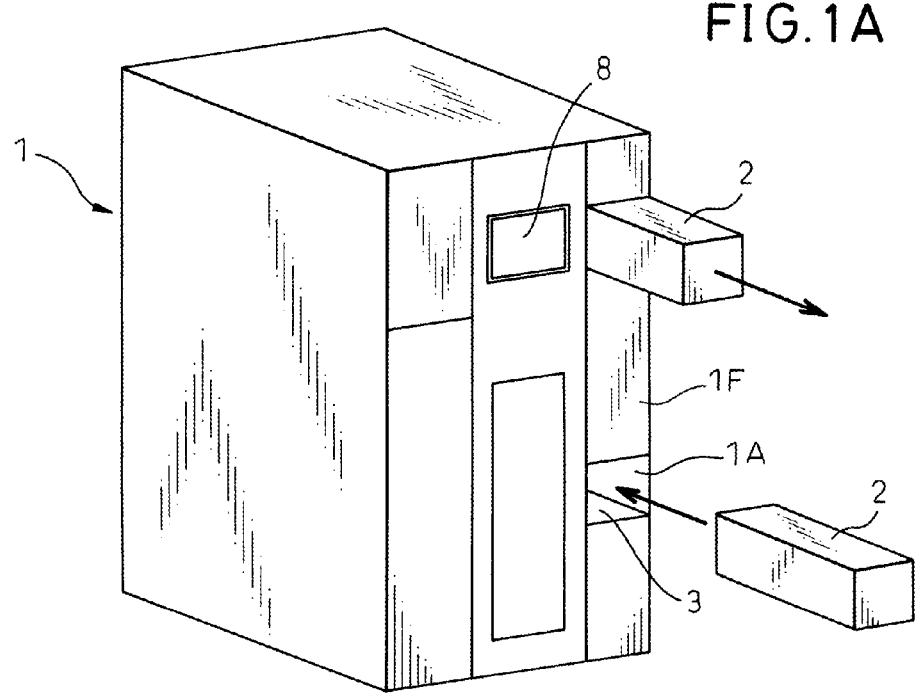
FIG. 1A is a perspective view which illustrates a library system of the present application which is provided with a cartridge magazine in brief.

Below, preferred embodiments of the present application will be explained with reference to the drawings. FIG. 1A illustrates a library system 1 of the present application which is provided with cartridge magazines 2 in brief. The library system 1 of this embodiment is provided inside it with about 100 magnetic tape cartridges (hereinafter simply referred to as "cartridges") and four tape drives. The cartridge magazines 2 are designed to be able to be loaded with about 10 cartridges and are taken out of and inserted into cartridge access stations (CAS) which are provided at the front panel 1F of the library system 1 so as to exchange and resupply cartridges inside the library system 1. Further, the front panel 1F has an operator panel 8 for operation of the library system 1.

Figure 1B:
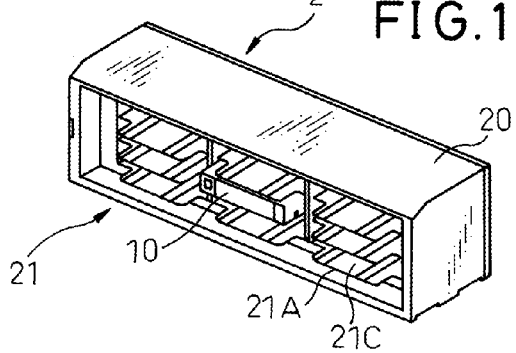
FIG. 1B is a perspective view which illustrates an appearance of the cartridge magazine of FIG. 1A.

FIG. 1B illustrates the appearance of one example of a cartridge magazine 2 which is illustrated in FIG. 1A. A cartridge storage cell assembly 21 which is built into the housing 20 of the cartridge magazine 2 of this embodiment includes nine cells 21C which are partitioned by nine shelves 21A and can hold cartridges 10 in the cells 21C. The number of the cartridges which can be stored in the cartridge magazine 2 differs depending on the size of the system. The detailed configuration of this cartridge magazine 2 will be explained later.

Figure 1D:
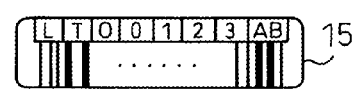
FIG. 1D is a plan view which illustrates one example of a seal which is adhered to an identification label adhering region of the cartridge of FIG. 1C.
Figure 1C:
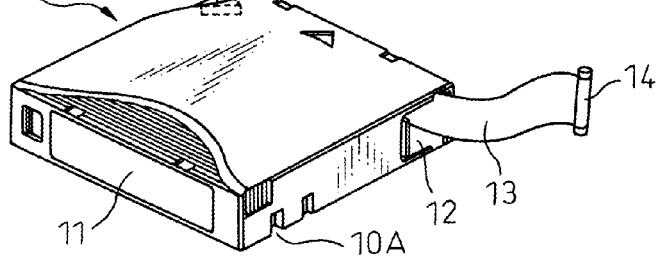
FIG. 1C is a perspective view which illustrates an appearance of a cartridge which is held in the cartridge magazine of FIG. 1B.

FIG. 1C illustrates the appearance of a cartridge 10 which is held in the cartridge magazine 2 which is illustrated in FIG. 1B. The cartridge 10 which is used in the library system 1 of this embodiment is called an "LTO (Linear Tape Open) cartridge" and is structured so that magnetic tape 13 is pulled out from a reel-out opening 12 which is provided at a side surface of the cartridge 10 while being guided by a leader pin 14. The storage capacity of the cartridge 10 differs depending on the specifications, but is 100 to 800 GB. At the side surfaces of the cartridge 10, in addition to the reel-out opening 12, there are an identification label adhering region 11, recessed parts 10A for insertion of hooks of a robot mentioned later, and a lock groove 10B which fastens the cartridge 10 to the cartridge magazine 2. The identification label adhering region 11 has adhered to it a bar code label 15 such as illustrated in FIG. 1D on which a bar code is printed. As the label which is adhered to the identification label adhering region 11, in addition to a bar code label 15, a label on which a 2D bar code is printed or a label on which a mark or symbols are printed may be used.

Figure 2A:
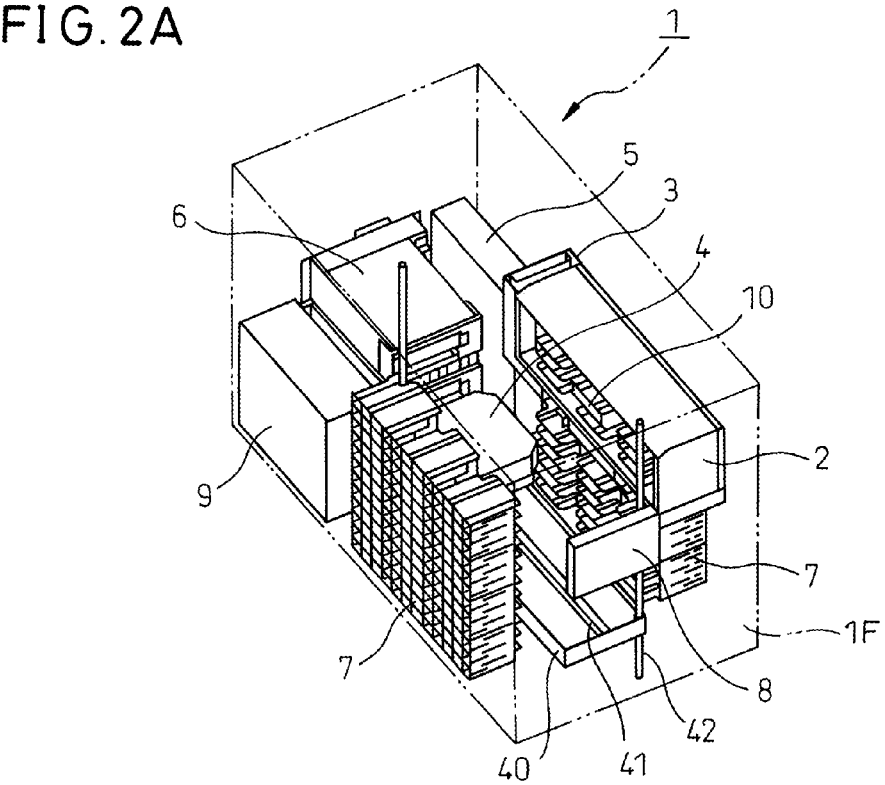
FIG. 2A is a see through view which illustrates one example of the configuration of the inside of a library system which is illustrated in FIG. 1A.

FIG. 2A illustrates one example of the configuration of the inside of the library system which is illustrated in FIG. 1A. The library system 1 includes a magazine holder 3, a robot 4, a controller 5, tape drives 6, storage cells 7, and a power supply 9. The magazine holder 3 holds the cartridge magazines 2, while the robot 4 conveys cartridges inside of the library system 1. The controller 5 and the tape drives 6 are controlled by input to the operator panel 8 which is provided at the front panel of the library system 1.

Inside of the library system 1, there is an elevator base 40 which moves up and down along an elevator pole 42. On the elevator base 40, there is a rail 41 which is laid in the depth direction (front-back direction) of the library system 1. The robot 4 can move on the rail 41 inside of the library system 1 and thereby move in the depth direction of the system and can move in the up-down direction inside of the system by up-down movement of the elevator base 40. Further, at the left and right directions of the rail 41, the cartridge magazines 2 and storage cells 7 are arranged, so the robot 4 can turn in a state stopped on the rail 41 and face the cartridge magazines 2 or storage cells 7. Further, robot 4 can pull out cartridges or insert cartridges into the cartridge magazines 2 or storage cells 7 in the state facing the cartridge magazines 2 or storage cells 7.

Further, the robot 4 can convey a cartridge 10 which was pulled out from a cartridge magazine 2 or a storage cell 7 and load it into a tape drive 6 or can convey a cartridge 10 which was ejected from a tape drive 6 and return it to a cartridge magazine 2 or storage cell 7. The library system 1 of this embodiment has four tape drives 6 stacked on top of each other. When cartridges 10 are inserted, these can read and write data on the magnetic tapes. In this figure, only one CAS 1A, the one which is illustrated in FIG. 1A, is illustrated.

Figure 2B:
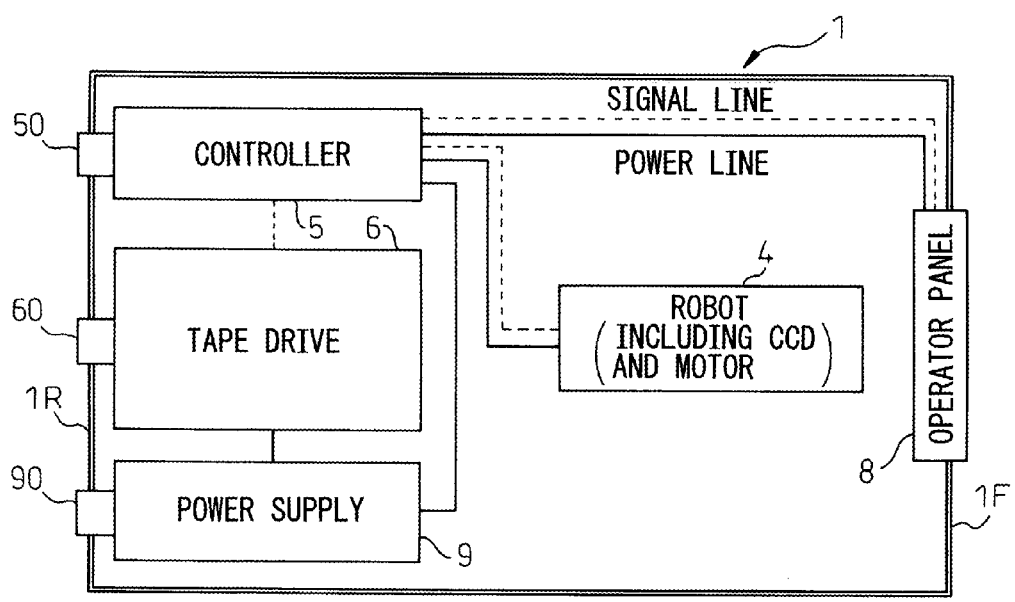
FIG. 2B is a block circuit diagram which illustrates a connection relationship of devices housed in the library system which is illustrated in FIG. 2A.

FIG. 2B is a block circuit diagram which illustrates the connection relationship of the robot 4, controller 5, tape drives 6, power supply 9, and operator panel 8 which is provided on the front panel 1F which are built into the library system 1 which is illustrated in FIG. 2A. The solid line illustrates the power line, while the dotted line illustrates the signal line. The robot 4 includes sensors using CCD's explained later and motors for making the robot move and rotate. A rear panel 1R of the library system 1 has an input/output terminal 50 of the controller 5, an input/output terminal 60 of the tape drive 6, and an input terminal 90. The input/output terminal 50 of the controller 5 is connected through an interface to a host computer, while the input/output terminal 60 of the tape drive 6 is also connected through an interface to the host computer. The power supply 9 is connected at its input terminal 90 to an AC power supply.

Figure 3A:
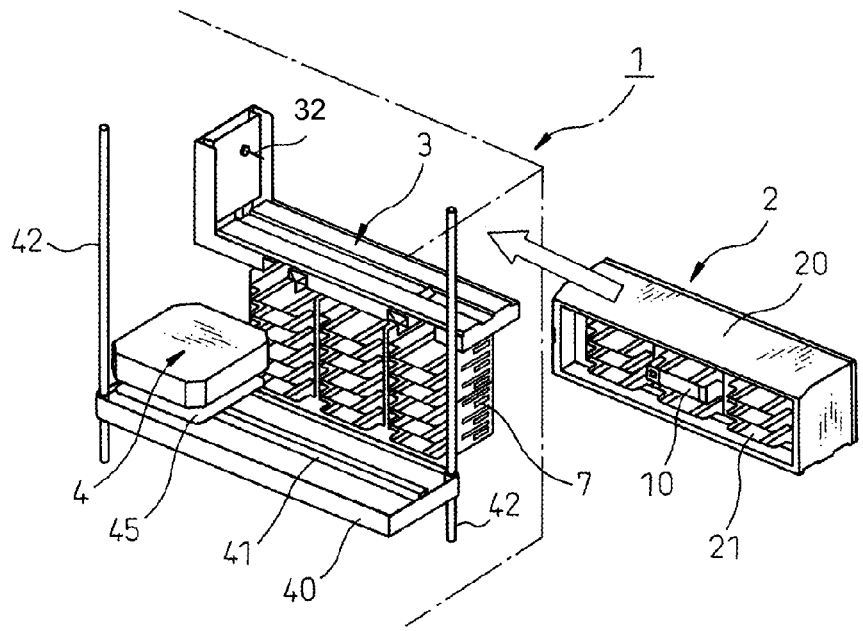
FIG. 3A is a partial see through view which illustrates a state before a cartridge magazine with a key lock mechanism of the present application is inserted in the library system which is illustrated in FIG. 2A.
Figure 3B:
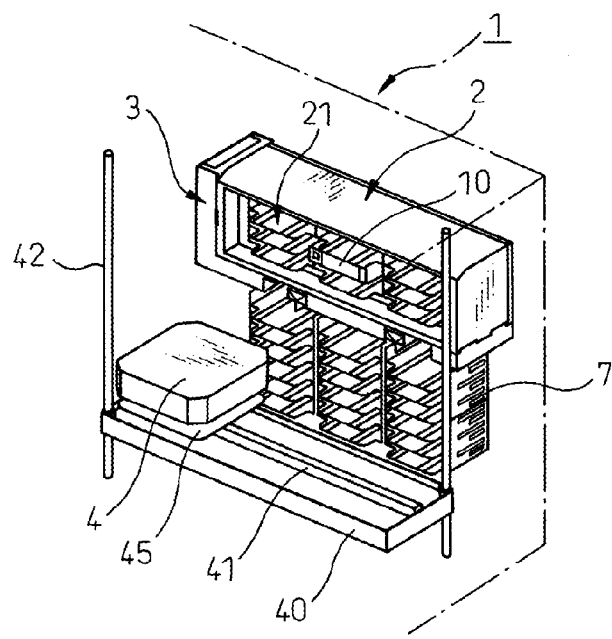
FIG. 3B is a partial see through view which illustrates a state where a cartridge magazine with a key lock mechanism which is illustrated in FIG. 3A is loaded into a magazine holder inside of the library system.

FIG. 3A illustrates the state before a cartridge magazine 2 is inserted into the library system which is illustrated in FIG. 2A, while FIG. 3B illustrates the state where the cartridge magazine 2 which is illustrated in FIG. 3A is loaded into a magazine holder 3 which is in the library system 1. As will be understood from these figures, the robot 4 can move on the rail 41 which is laid on the top surface of the elevator base 40 in the depth direction of the library system 1 and can move in the up-down direction as well since the elevator base 40 can move along the elevator pole 42 in the up-down direction. Further, the robot 4 can rotate on the movement base 45, so can face the cartridge magazines 2 or storage cells 7 and can face the tape drives. Accordingly, the robot 4 can take out and insert the conveyed cartridges 10 from and to the cartridge magazines 2, storage cells 7, and tape drives 6 (see FIG. 2A).

Figure 4A:
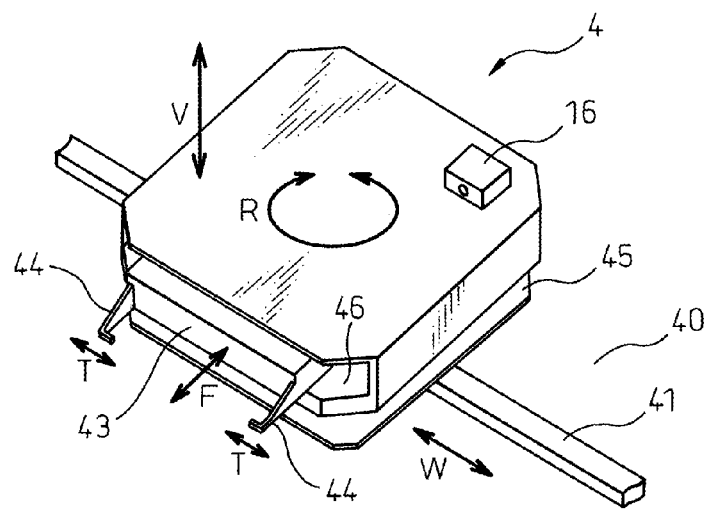
FIG. 4A is a perspective view which explains an operation of the robot which is illustrated in FIGS. 3A and 3B.

FIG. 4A explains the operation of the robot 4 which is illustrated in FIGS. 3A and 3B. The robot 4 can move on the rail 41 which is laid on the top surface of the elevator base 40 in the depth direction of the library system 1 since the movement base 45 which supports the robot 4 can move in the direction which is illustrated by the arrow W. Further, the robot 4, as explained in FIGS. 3A and 3B, can move in the up-down direction of the library system 1 since the elevator base 40 can move up and down in the arrow V direction. Furthermore, the robot 4 can rotate on the movement base 45 in the direction which is shown by the arrow R. The movement and rotation of the robot 4 are performed by built-in motors.

On the other hand, the robot 4 is provided with a picker 43 which can move in an arrow F direction with respect to an opening 46 which is provided at a front side of the robot 4. Further, the front end of the picker 43, which can advance and retract from the robot 4, is provided with two finger-shaped hooks 44. The front ends of the hooks 44 are bent. The two hooks 44 are interlocked and move back and forth in the direction which is illustrated by the arrow T, whereby a cartridge 10 can be gripped. The drive source of the picker 43 is also a built-in motor. Further, the top surface of the robot 4 is provided with a sensor 16 for reading a position of the gripped cartridge or a bar code label 15 which is illustrated in FIG. 1D. The position of the sensor 16 is not limited to the top surface of the robot 4.

Figure 4B:
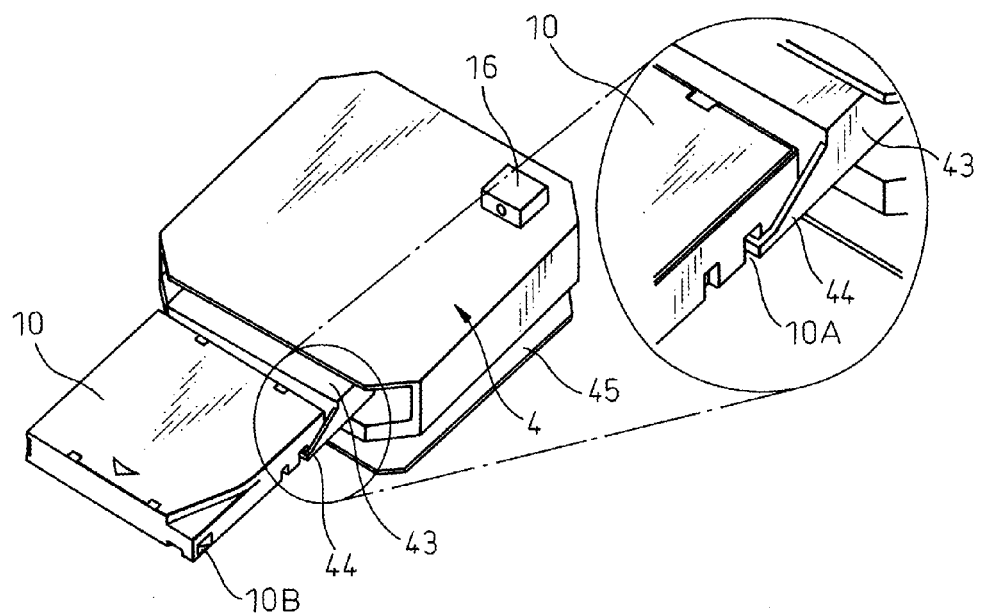
FIG. 4B is a perspective view and a partial enlarged view of a robot which explain the state where the robot which is illustrated in FIG. 4A grips a cartridge.

FIG. 4B explains the state where the robot 4 which is illustrated in FIG. 4A grips a cartridge 10. The robot 4, as explained in FIG. 4A, moves in the up-down and depth directions. When positioned in front of the desired cartridge by the sensor 16, it opens the hooks 44 while making the picker 43 stick out from the robot 4. Further, by closing the hooks 44 and making the bent front ends enter the recesses 10A at the two side surfaces of the cartridge 10, it grips the cartridge 10. After this, the robot 4 retracts the picker 43 to the inside of the robot 4, whereby the cartridge 10 can be taken out from the cartridge magazine or the storage cell and conveyed.

Figure 5A:
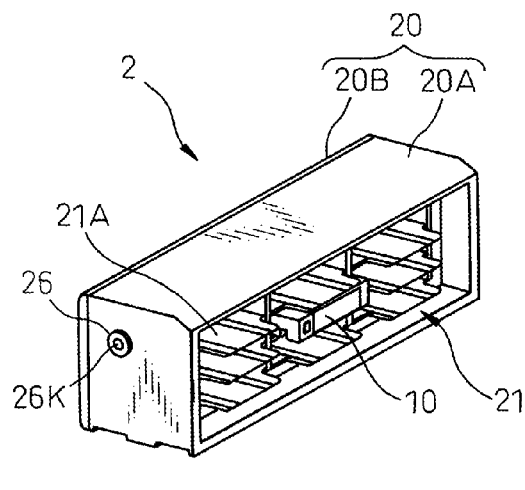
FIG. 5A is a perspective view which views the configuration of the cartridge magazine with a key lock mechanism of one embodiment of the present application obliquely from above.
Figure 5B:
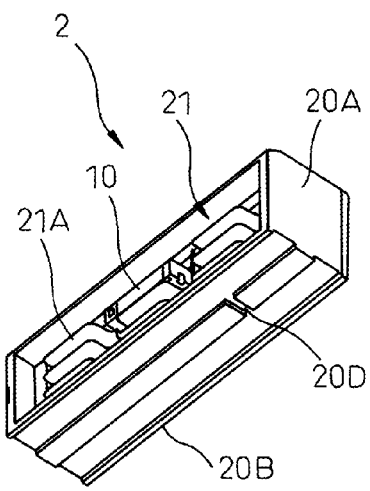
FIG. 5B is an explanatory view which views the cartridge magazine with a key lock mechanism which is illustrated in FIG. 5A obliquely from below.
Figure 5C:
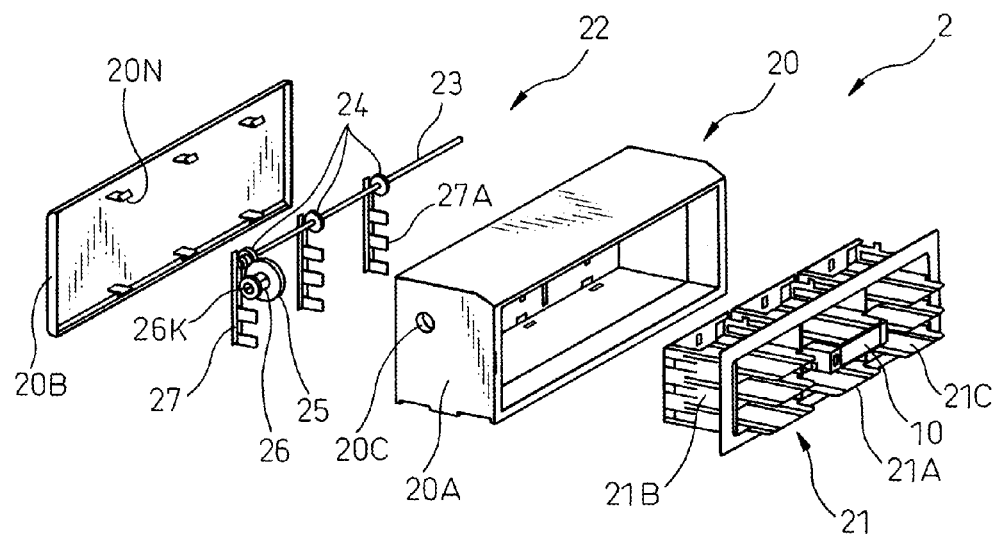
FIG. 5C is a partial perspective view which illustrates the configuration of a cartridge magazine with a key lock mechanism which is illustrated in FIGS. 5A and 5B.

FIG. 5A illustrates the side of the cartridge magazine 2 which is illustrated in FIG. 1B which is inserted into the library system as seen obliquely from the top, while FIG. 5B illustrates the cartridge magazine 2 which is illustrated in FIG. 5A obliquely from the bottom in the opposite direction. Further, FIG. 5C illustrates the disassembled state of the cartridge magazine 2 which is illustrated in FIGS. 5A and 5B. As will be understood from these figures, the cartridge magazine 2 of the present application is comprised of a housing 20 which is provided with a main body 20A and a rear cover 20B inside of which a cartridge storage cell assembly 21, key lock mechanism 22, and a drive mechanism 25, 26 of the key lock mechanism 22 are held. The rear cover 20B is provided with tabs 20N. These tabs 20N are inserted into the main body 20A for fastening.

The cartridge storage cell assembly 21 of this embodiment is provided with nine cells 21C which are partitioned by nine shelves 21A and side walls 21B. The cells 21C respectively house and hold cartridges 10. Further, the side walls 21B of the cells 21C, as explained in detail later, are provided with plate springs which are provided with lock projections for locking withdrawal of cartridges. On the other hand, the key lock mechanism 22 is comprised of a shaft 23, gears 24, and three lock blocks 27 provided with three base plates 27A. Further, the key lock mechanism 22 includes a drive mechanism comprised of a drive gear 25 which makes the lock blocks 27 move up and down and a key insertion hole 26K into which a key for making the drive gear 25 rotate is to be inserted. 20C is a cylinder bore through which the cylinder 26 is inserted.

Figure 6A:
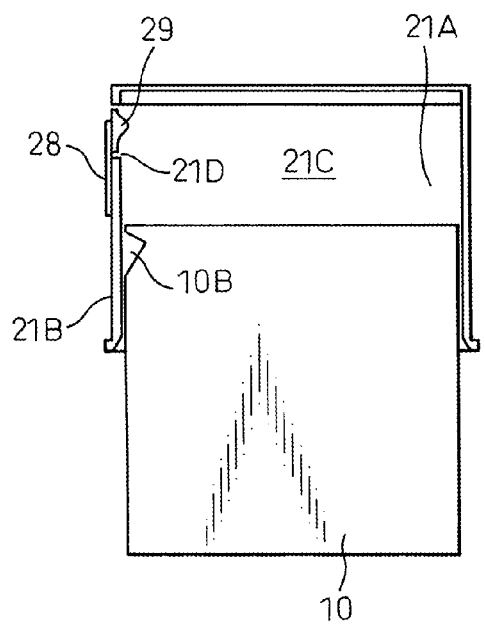
FIG. 6A is a partial enlarged plan view which illustrates the state where a cartridge is inserted into one cell of the cartridge magazine with a key lock mechanism which is illustrated in FIG. 5A.

FIG. 6A illustrates the structure of one of the cells 21C of the cartridge magazine 2, at which the key lock mechanism 22 which is illustrated in FIG. 5A to FIG. 5C is provided, together with the cartridge 10. At the back end part of one of the wall surfaces 21B of each cell 21C, a through hole 21D is provided. Inside this through hole 21D, a lock projection 29 which sticks out inside the cell 21C is provided while fastened to the front end of the plate spring 28. The lock projection 29 is generally formed by a plastic block. A base part of the plate spring 28 is fastened to the side wall 21B. Further, a side surface of the cartridge 10 at the deep side of the cell 21C is provided with a recessed part 10B. Note that the structure of the cells 21C of the cartridge magazine 2 in the same in all cells in the storage cells 7 which are illustrated in FIG. 2A.

Figure 6B:
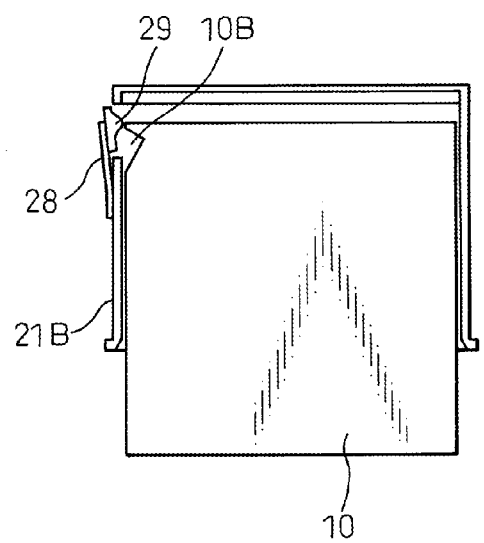
FIG. 6B is a partial enlarged view which illustrates the state where the cartridge which is illustrated in FIG. 6A continues to move in the insertion direction and engages with the key lock mechanism.

FIG. 6B illustrates the structure by which the cartridge 10 which is illustrated in FIG. 6A is further inserted inside the cell 21C and the front end of the cartridge 10 in the insertion direction abuts against the lock projection 29. If the front end of the cartridge 10 abuts against the lock projection 29, the front end of the cartridge 10 moves along the slanted surface of the lock projection 29, so the lock projection 29 bends the plate spring 28 while being pushed to the outside of the side wall 21B. If the cartridge 10 is further inserted into the cell 21C, the lock projection 29 enters the recessed part 10B of the cartridge 10 by the recovery force of the plate spring 28, the lock projection 29 returns to the inside of the through hole 21D, and the state which is illustrated in FIG. 6C results.

Figure 6C:
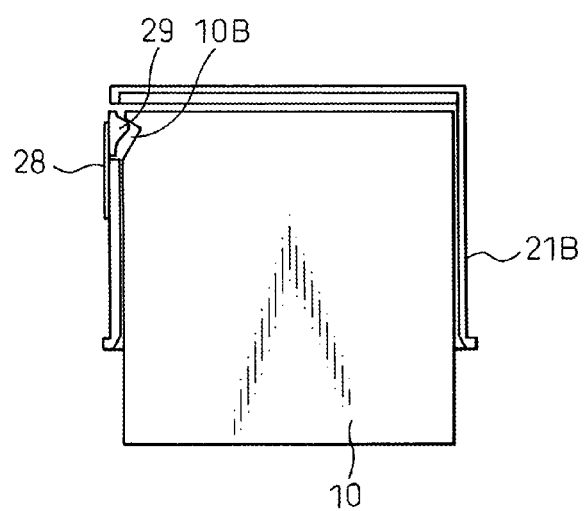
FIG. 6C is a partial enlarged plan view which illustrates the state where the cartridge which is illustrated in FIG. 6B continues to further move and is locked by the key lock mechanism.

In the state which is illustrated in FIG. 6C, the recessed part 10B of the cartridge 10 engages with the lock projection 29, so the cartridge 10 never naturally falls off from inside the cell 21C. On the other hand, when, in the state of FIG. 6C, the cartridge 10 is pulled out by the picker, the front end of the cartridge 10 moves along the slanted surface at the opposite side of the lock projection 29. This being so, the lock projection 29 bends the plate spring 29 while being pushed to the outside of the side wall 21B and, as illustrated in FIG. 6B, the lock projection 29 no longer locks the cartridge 10, so the cartridge 10 can be pulled out from the cell 21C. In this way, if each cell in a cartridge magazine 2 and storage cells 7 stores a cartridge, the cartridge may not be withdrawn from the cell unless pulling by a certain constant force.

Here, consider the case where in the plate spring 28 with a base part fastened to the side wall 21B, the front end of the plate spring 28 at which the lock projection 29 is provided is blocked so as not to deform due to some sort of member from the outside. In this case, if pulling out a cartridge 10 from a cell 21C, as explained above, even if the front end of the cartridge 10 moves along the slanted surface at the opposite side of the lock projection 29, the plate spring 28 will not bend. Therefore, the cartridge 10 may not be pulled out from the cell 21C. This state is the state where the lock projection 29 locks the cartridge 10 and is the state where the cartridge 10 may not be pulled out from the cartridge storage assembly of the cartridge magazine.

In the present embodiment, as explained later, a magazine holder which holds a cartridge magazine has a lock mechanism which is designed to prevent a cartridge from being pulled out from the cartridge magazine and a lock mechanism which is designed to prevent the cartridge magazine from being taken out from the magazine holder. Therefore, the state where a cartridge 10 may not be pulled out from the cartridge magazine will subsequently be explained as the state where the cartridge magazine is "key locked". This is because the state where the cartridge 10 may not be pulled out from the cartridge magazine arises due to the key. Further, the opposite state, that is, the state where the cartridge 10 is pulled out from the cartridge magazine, will be explained as the cartridge magazine being in the "unlock state". Further, the lock for preventing a cartridge magazine from being taken out from the magazine holder will be explained as a "takeout lock".

Note that, in the embodiment which is illustrated from FIG. 6A to FIG. 6C, the configuration is illustrated where the lock projection 29 is fastened to one end of the plate spring 28 which is fastened to the side wall 21B at its other end, but the lock projection 29 may also be configured to be biased by a compression spring and stick out into the cell 21C. In this case, it is sufficient to provide a box for holding the compression spring at the outside of the side wall 21B.

Figure 7A:
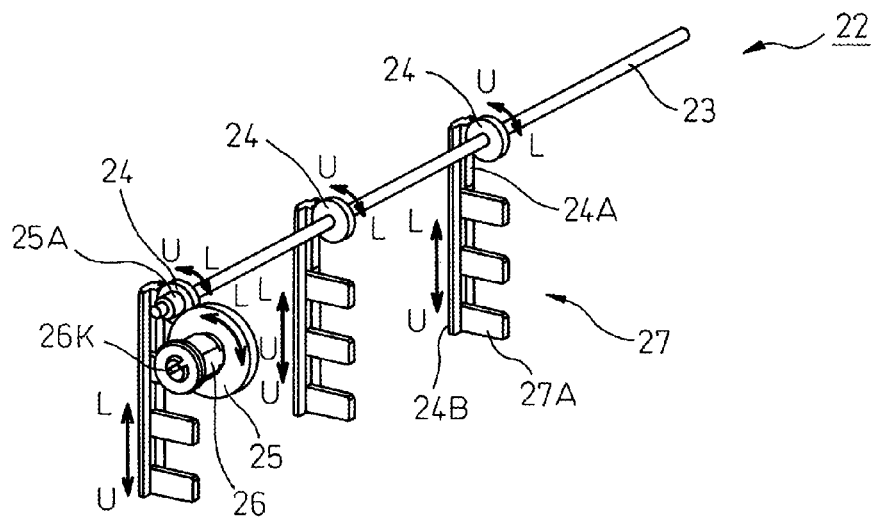
FIG. 7A is a partial enlarged mechanical view which explains the operation of the key lock mechanism in the cartridge magazine which is illustrated in FIG. 5C.

FIG. 7A explains the operation of the key lock mechanism 22 in the cartridge magazine 20 which is illustrated in FIG. 5C. The key lock mechanism 22 is provided with lock plates 27A as members which block deformation of the front end of the plate spring 28 from the outside. If a key is inserted into the key insertion hole 26K of the cylinder 26 and the key is turned to make the drive gear 25 turn in the arrow L direction, the three gears (pinions) 24 which are provided on the shaft 23 at predetermined intervals rotate in the arrow L direction. The three gears 24 mesh with the racks 24A which are formed on rods 24B to which the lock plates 27A are attached. If the gears 24 turn in the arrow L direction, the rods 24B move in the arrow L direction, that is, in the up direction. On the other hand, if the key which is inserted into the key insertion hole 26K of the cylinder 26 is turned to make the drive gear 25 turn in the arrow U direction, a power transmission gear 25A which is attached to the shaft 23 turns in the arrow U direction so that the three gears 24 which are also attached to the shaft 23 respectively turn in the arrow U direction. The rods 24B also turn in the arrow U direction whereby the rods 24B descend.

Figure 7B:
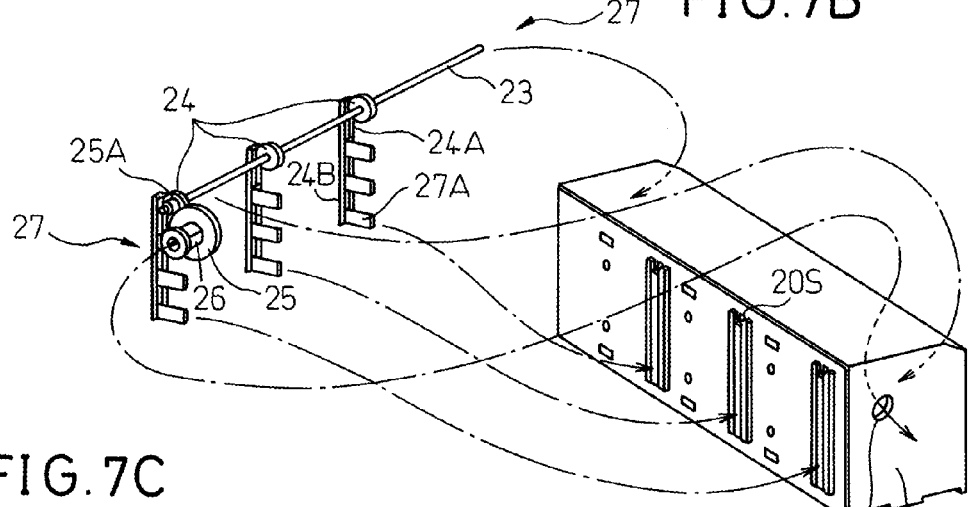
FIG. 7B is an assembled perspective view which explains attaching of the key lock mechanism of FIG. 7A to the cartridge magazine housing.
Figure 7C:
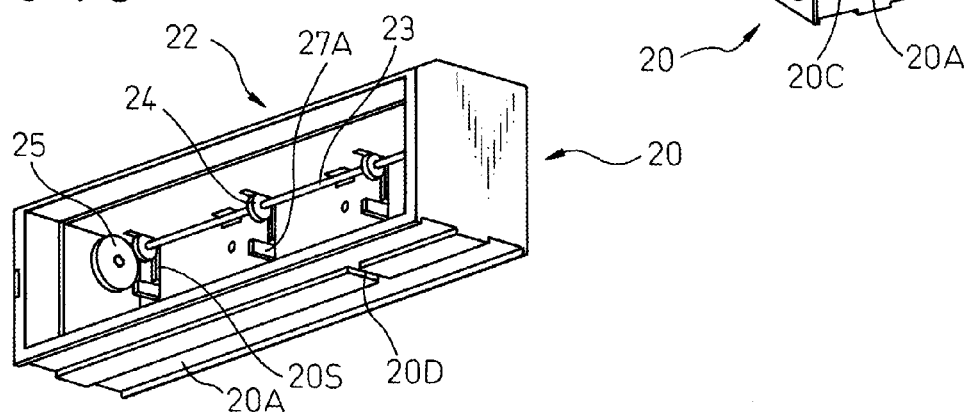
FIG. 7C is a perspective view which views the state where the key lock mechanism which is illustrated in FIG. 7A is attached to the housing of the cartridge magazine as seen from the front surface side.

FIG. 7B explains the attachment of the shaft 23, gears 24, drive gear 25, a power transmission gear 25A, cylinder 26, and lock block 27 which are illustrated in FIG. 7A to the housing 20 of a cartridge magazine. The shaft 23, gears 24, drive gear25, and cylinder 26 are attached to the housing 20 from the front surface side of the housing 20, while the lock block 27 is attached to the housing 20 from the back surface side of the housing 20. That is, the lock block 27 is attached to the housing 20 after passing the lock plates 27A through slits 20S which are provided at the back surface of the housing 20. FIG. 7C illustrates the state where the key lock mechanism 22 and the drive mechanism which are illustrated in FIG. 7A are assembled into the housing 20 of a cartridge magazine as seen from the front surface side.

Figure 8A:
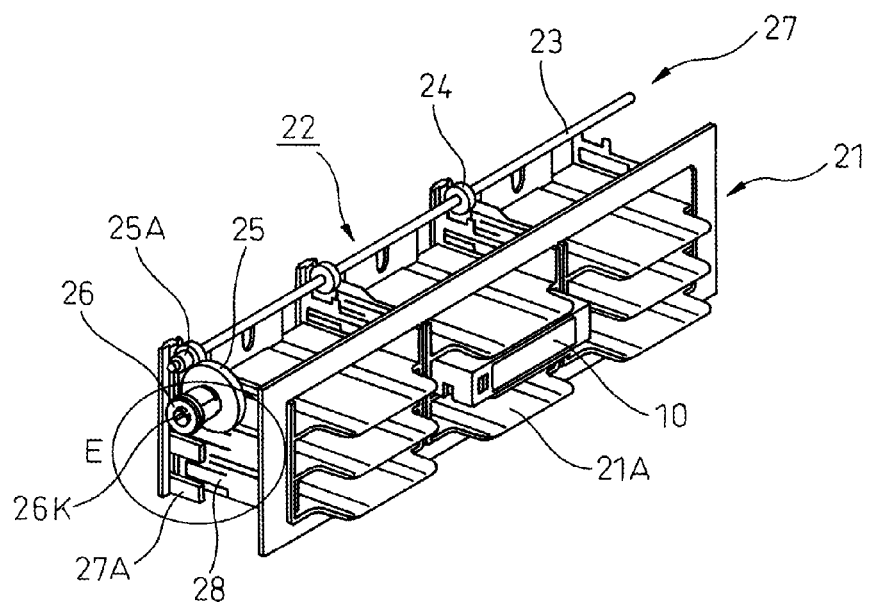
FIG. 8A is a perspective view which illustrates the state where the key lock mechanism which was explained in FIG. 7A is assembled on the cartridge storing assembly which is illustrated in FIG. 5C and illustrates the unlock state where the cartridge is taken out.
Figure 8B:
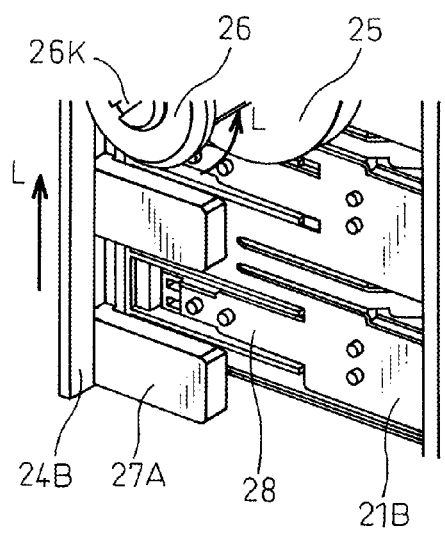
FIG. 8B is a partial enlarged perspective view of a part E in FIG. 8A.

FIG. 8A shows the state where the key lock mechanism 22 which is explained in FIG. 7A is assembled into the cartridge storage assembly 21 which is illustrated in FIG. 5C. The state which is illustrated in FIG. 8A illustrates the unlock state where a cartridge 10 can be taken out from the cartridge storage assembly 21. FIG. 8B illustrates the part E of FIG. 8A partially enlarged. In this state, the lock plates 27A which are attached to the rod 24B do not overlap the plate springs 28 which are attached to the side wall 21B of the cell 21C. Therefore, in this state, the plate springs 28 can be bent outward from the side wall 21B.

Figure 8C:
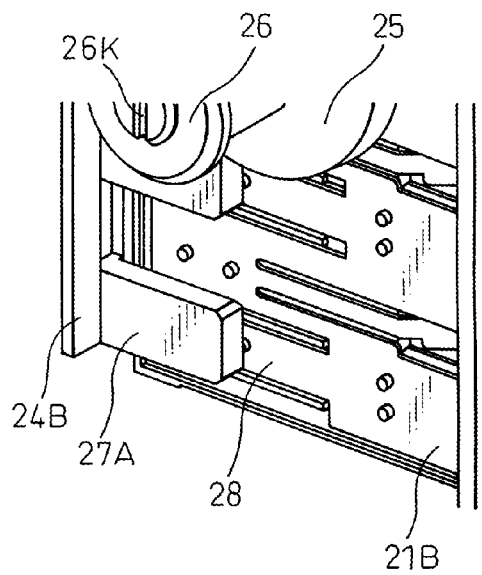
Figure 9A:
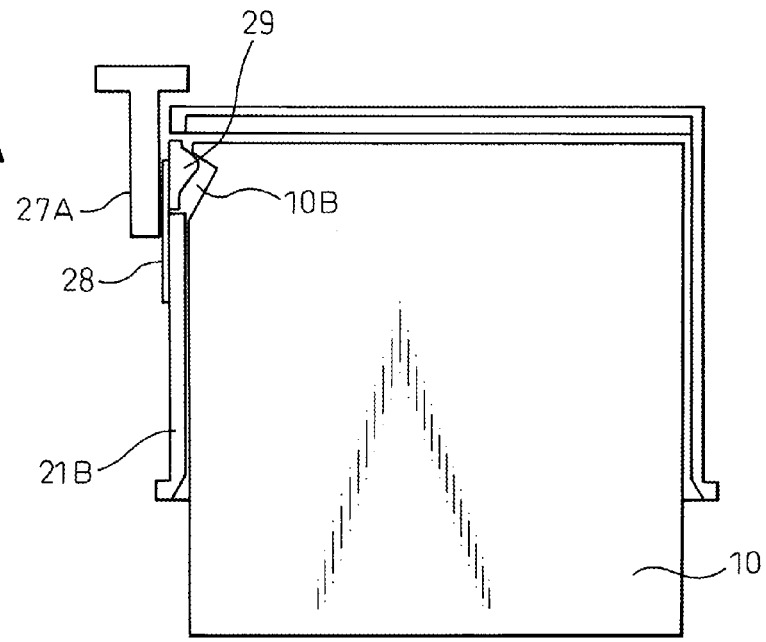
FIG. 9A is a partial enlarged plan view which illustrates the key lock state where a cartridge in a cell which is illustrated in FIG. 6C is locked by the lock plates which are illustrated in FIG. 8C.

On the other hand, in the state of FIG. 8B, as explained in FIG. 7A, if a key which is inserted in the key insertion hole 26K is used to make the cylinder 26 turn in the lock direction which is illustrated by the arrow L, the lock plates 27A rise in the arrow L direction resulting in the state of FIG. 8C and overlap the plate springs 28 which are provided at the side wall 21B of each cell 21C. If viewing the state of FIG. 8C by a plan view, the result becomes FIG. 9A. Therefore, in this state, the plate springs 28 which are attached to the side wall 21B of the cell 21 are blocked by the lock plates 27A and may not bend to the outside of the side wall 21B. Accordingly, in this state, even if the picker attempts to pull out the cartridge 10 inside the cell 21C picker or even if a strong force from the outside tries to pull it out, the lock projection 29 which is inserted in the recess 10B of the cartridge 10 does not move due to the lock plates 27A, so the cartridge 10 is prevented from being pulled out from the cell 21C. Further, if forcibly pulling out a cartridge 10 from a cell 21C, the cartridge 10 will be damaged and use will become impossible.

Note that, as explained above, even if trying to make the lock projection 29 stick out inside the cell 21C by a compression spring which is held in a box which is provided at the outside of the side walls 21B, movement of the lock projection 29 can be prevented when using a key to make the cylinder 26 turn in the lock direction which is illustrated by the arrow L. That is, it is sufficient to provide slits at the part for attachment of the wall surface of the lower side box to the side wall 21B, form the lock plates 27A of the lock block 27 thinner, and insert the lock plates 27A into the box from the slits at the time of raising the lock plates 27A. If doing so, since the lock plates 27A are inserted between the compression spring in the box and the lock projection 29, the lock projection 29 can no longer be moved by the lock plates 27A.

Figure 9B:
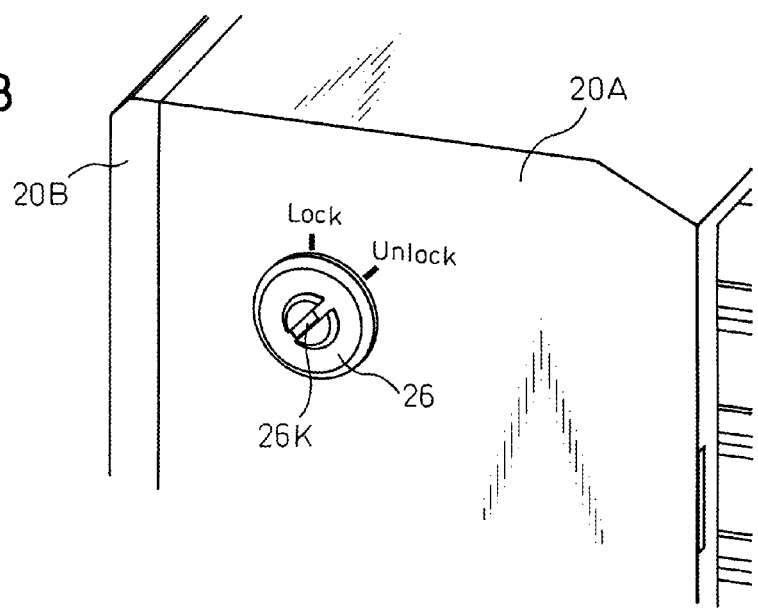
FIG. 9B is a partial enlarged plan view which illustrates the state where words are printed on the cartridge magazine at the outside of a cylinder so as to enable the unlocked state which is illustrated in FIG. 8B and the key lock state which is illustrated in FIG. 8C to be discerned from the outside.

FIG. 9B illustrates an embodiment designed to enable the unlock state of the cartridge magazine which is illustrated in FIG. 8B and the key lock state of the cartridge magazine which is illustrated in FIG. 8C to be discerned from the outside. In this embodiment, words are printed at the side surface of the main body 20A of the cartridge magazine at the outside of the cylinder 26 so as to enable the lock state and unlock state of the cartridge magazine to be visually determined from the outside.

FIG. 10A illustrates the appearance of the magazine holder 3 which is illustrated in FIG. 3A. The magazine holder 3 has a base 30 which is provided with a horizontal part 30H and a vertical part 30V. The magazine holder 3 has a key lock/unlock mechanism 3C of the cartridge magazine which sets the above-mentioned cartridge magazine in the key lock state and unlock state and a takeout lock/unlock mechanism 3M of the cartridge magazine which prevents the cartridge magazine from being taken out from the magazine holder 3 from the outside. The key lock/unlock mechanism 3C of the cartridge magazine is provided straddling the horizontal part 30H and the vertical part 30V of the base 30, while the takeout lock/unlock mechanism 3M of the cartridge magazine is provided at only the horizontal part 30H of the base 30.

The takeout lock/unlock mechanism 3M of the cartridge magazine, as illustrated in FIG. 10B, is provided with a plate spring 38 which is provided near the hole 30A which is provided at the top surface of the horizontal part 30H of the base and has a lock projection 38A and with a first slide block 35. The plate spring 38 is fastened to the bottom surface of the horizontal part 30H of the base at its base part so that the lock projection 38A sticks out from the hole 30A. The first slide block 35 can move guided by two parallel shafts 39 which are provided below the horizontal part 30H of the base and can slide inside a cutaway part 51 which is provided at the other side surface of the horizontal part 30H of the base in the arrow L-U direction.

At the vertical part 30V side of the base 30 of the key lock/unlock mechanism 3C of the cartridge magazine, there are the key 32, key-use gear 33K, vertical direction gear train 33V, and bevel gear 34V. Further, at the horizontal part 30H side of the base 30, there are the horizontal direction gear train 33H, bevel gear 34H, second slide block 36, and rack 37. The key-use gear 33K at which the key 32 is provided is connected through the vertical direction gear train 33V to the bevel gear 34. If the bevel gear 34V turns, the key 32 turns. Further, if a gear cover 31 is attached to the vertical part 30V of the base, as illustrated in FIG. 10A, only the key 32 sticks out from the gear cover 31.

The second slide block 36 can move guided by the two parallel shafts 39 which are provided below the horizontal part 30H of the base and can slide in the arrow L-U direction inside the second cutaway part 52 which is provided at one side surface of the horizontal part 30H of the base. The second slide block 36 can slide independent from the first slide block 35. The second slide block 36 is provided with a rack 37. At the bottom side of the connecting part of the horizontal part 30H and the vertical part 30V of the base, a rear cover 53 is provided. On this rear cover 53, a horizontal direction gear train 33H which includes a bevel gear 34H is provided. The rack 37 is connected through the horizontal direction gear train 33H to the bevel gear 34H. If the rack 37 moves, the bevel gear 34H rotates.

Figure 11A:
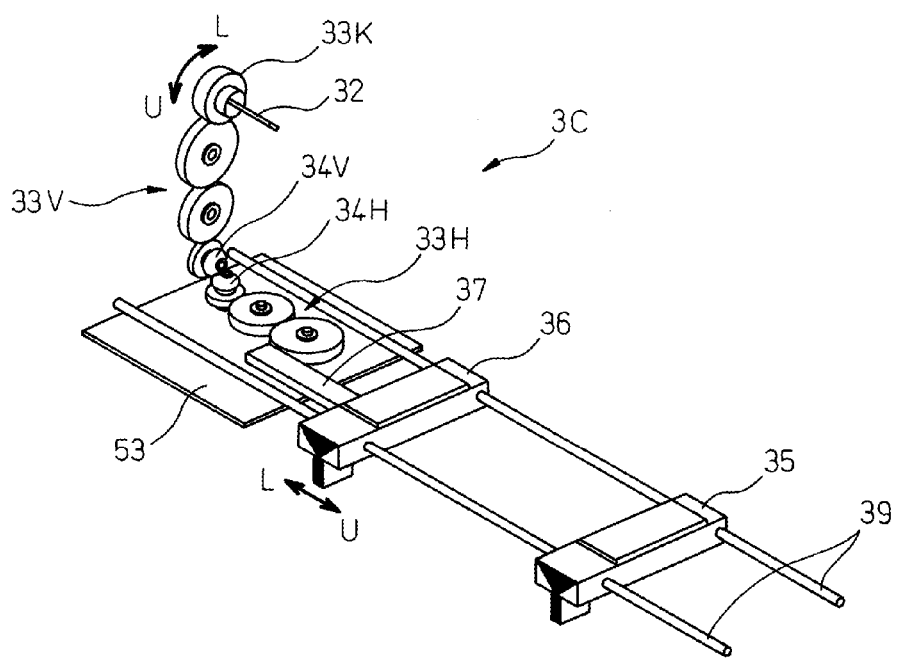
FIG. 11A is a perspective view which explains a connected state of a vertical direction gear train for driving the key which is illustrated in FIG. 10B and a horizontal direction gear train which is driven by the second slide block.

Further, if the rear cover 53 is attached to the horizontal part 30H of the base 30, as illustrated in FIG. 11A, the bevel gear 34H and the bevel gear 34V mesh. Accordingly, if the second slide block 36 moves in the L-U direction, the key 32 rotates in the L-U direction through the rack 37, horizontal direction gear train 33H, bevel gears 34H, 34V, vertical direction gear train 33V, and key-use gear 33K. The first slide block 35 and the second slide block 36 will be explained later, but are designed to be made to slide by the hooks 44 of the robot 4 which was explained in FIG. 4A, FIG. 4B. The slide ranges of the first slide block 35 and the second slide block 36 are defined by the widths of the first and second cutaway parts 51, 52.

Figure 11B:
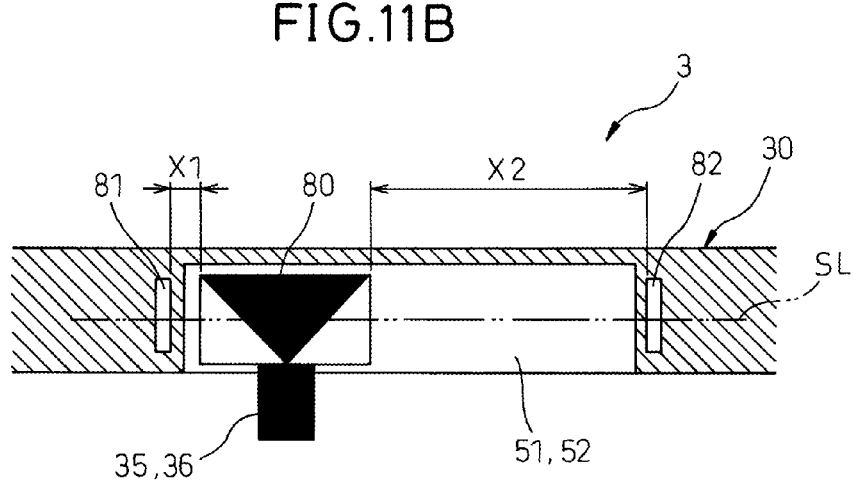
FIG. 11B is a partial enlarged front view of a magazine holder which illustrates a flag which is printed on a slide block which is illustrated in FIG. 11A.

FIG. 11B is a partial enlarged front view of a magazine holder 3 which illustrates the flags 80 which are printed on the first and second slide blocks 35, 36 which are illustrated in FIG. 11A. The first and second slide blocks 35, 36 can be made to slide in the library system by an existing robot. Therefore, in the present application, flags 80 are provided at the surfaces of the first and second slide blocks 35, 36 at the robot side and the flags 80 are read by sensors for reading bar code labels and for positioning which are mounted on the robot. The flags 80 form triangular shapes. By the sensors reading the flags 80, it is possible to accurately recognize the positions of the first and second slide blocks 35, 36 (up, down, left, and right).

Further, it is possible to provide rectangular flags 81 and 82 at the two sides of the first and second cutaway parts 51, 52 at the horizontal part 30H of the base and read the distances x1, x2 between the first and second slide blocks 35, 36 by a sensor so as to detect the positions of the first and second slide blocks 35, 36 with respect to the horizontal part 30H of the base. That is, by detecting the distances x1, x2, it is possible to detect whether the first and second slide blocks 35, 36 are respectively at the key lock position and takeout lock position or are in the unlock position. The reference notation SL which is illustrated in the figure is the line for reading the flags 81 and 82.

Figure 12A:
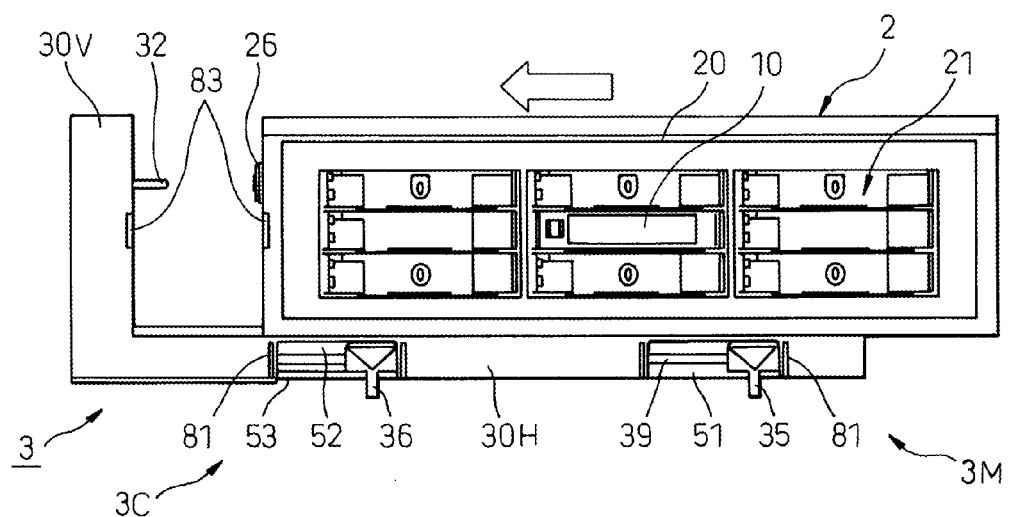
FIG. 12A is a partial enlarged front view which illustrates the state right before the cartridge magazine which is illustrated in FIG. 5A is carried in an unlocked state at the magazine holder which is illustrated in FIG. 10A.

FIG. 12A illustrates the state right before the cartridge magazine which is illustrated in FIG. 5A is loaded in the unlock state in the magazine holder 3 which is illustrated in FIG. 10A. In this embodiment, rectangular flags 83 are provided at the front end of the cartridge magazine 2 and the base of the magazine holder 3 at the surface at the robot side of the vertical part 30V. Further, when loading the cartridge magazine 2 in the magazine holder 3, it is possible to confirm the interval between the flags 83 by a sensor so as to confirm the loaded state of the cartridge magazine 2 in the magazine holder 3. The state which is illustrated in FIG. 12A is the state where both the first slide block 35 of the takeout lock/unlock mechanism 3M of the cartridge magazine and the second slide block 36 of the key lock/unlock mechanism 3C of the cartridge magazine are in the unlock position.

Figure 12B:
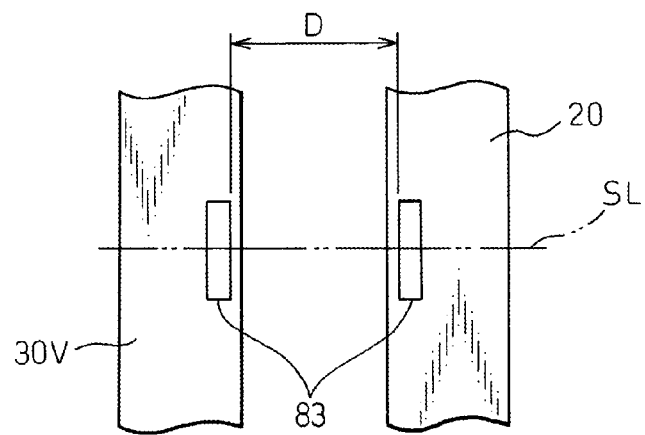
FIG. 12B is a partial enlarged front view which explains the positions of flags which are provided at the magazine holder and the cartridge magazine in the state which is illustrated in FIG. 12A.
Figure 12C:
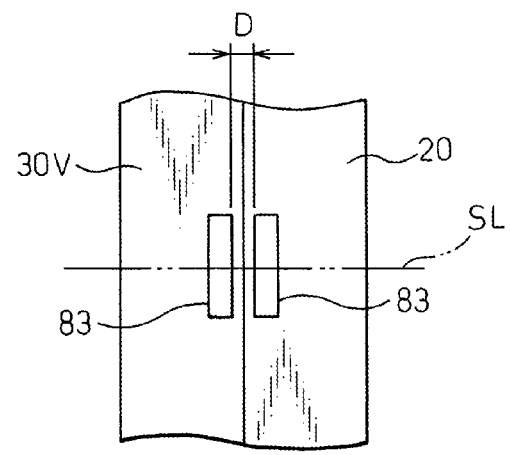
FIG. 12C is a partial enlarged front view which explains the states of flags which are provided at both the parts in the state where the cartridge magazine finishes being carried at the magazine holder which is illustrated in FIG. 12A.

That is, as illustrated in FIG. 12B, when the distance D between the two flags 83 is a predetermined value or more, it is judged that the cartridge magazine 2 is still not completely loaded in the magazine holder 3. As illustrated in FIG. 12C, when the distance D between the two flags 83 is less than a predetermined value, it can be judged that the cartridge magazine 2 has finished being loaded in the magazine holder 3. Reference sign SL which is illustrated in the figure is a line which reads the flag 83.

Figure 13A:
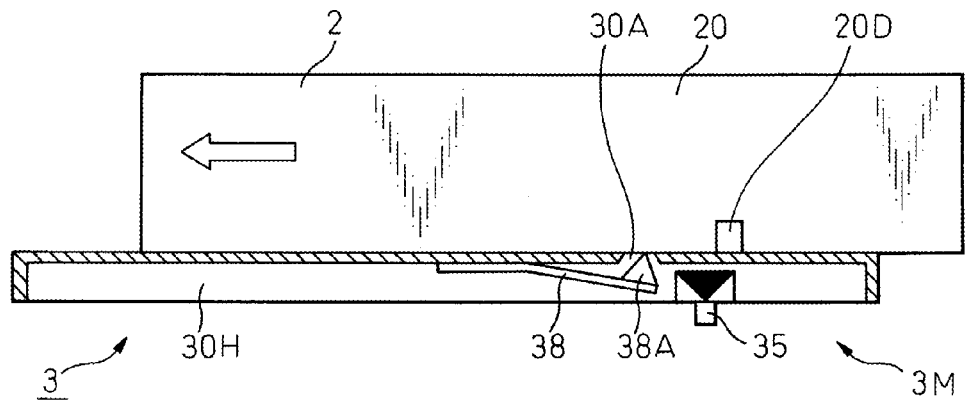
FIG. 13A is an explanatory view which explains an engagement relationship among a groove which is provided at the bottom of the cartridge magazine, a plate spring which is provided at the magazine hold, and a first slide block in the state of FIG. 12A.
Figure 13B:
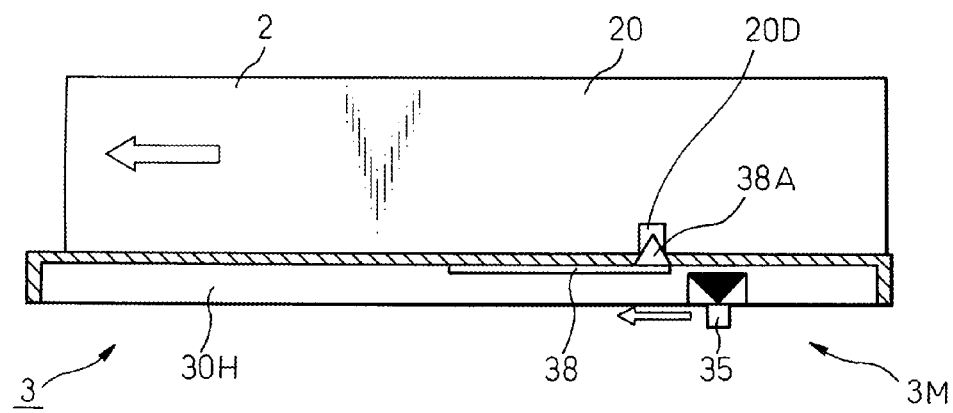
FIG. 13B is an explanatory view which explains the connection relationship among a groove which is provided at the bottom of the cartridge magazine, a plate spring which is provided at the magazine holder, and a first slide block at the time when the cartridge magazine which was illustrated in FIG. 13A finishes being loaded into the magazine holder.
Figure 13C:
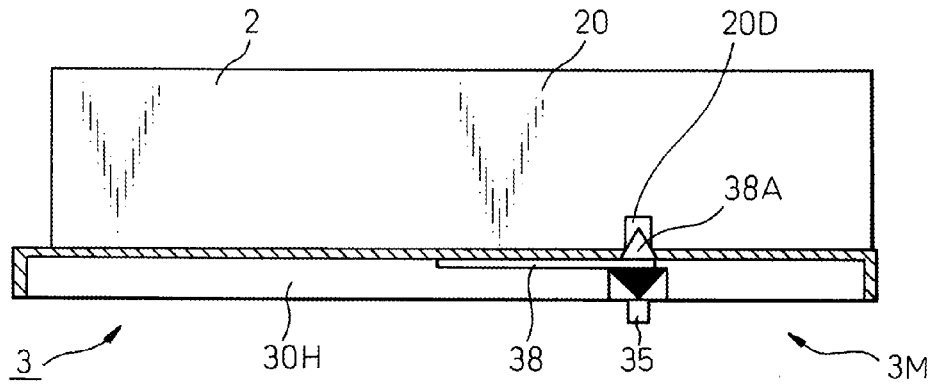
FIG. 13C is an explanatory view which illustrates the state where a first slide block locks the plate spring in the state of FIG. 13B.

FIG. 13A to FIG. 13C explain the function of the first slide block 35 which restricts operation of the lock projection 38A of the takeout lock/unlock mechanism 3M of the cartridge magazine of the magazine holder 3. FIG. 13A illustrates the engagement relationship of the groove part 20D which is provided at the bottom part of the cartridge magazine 2 in the state of FIG. 12A and the plate spring 38 and lock projection 38A of the takeout lock/unlock mechanism 3M of the cartridge magazine and the first slide block 35. Before the cartridge magazine 2 finishes being loaded in the magazine holder 3, the bottom part of the cartridge magazine 2 is used to push against the lock projection 38A, the lock projection 38A is pushed out from the hole 30A, and the plate spring 38 bends. The first slide block 35 is at the unlock position.

FIG. 13B illustrates the state where the cartridge magazine 2 which is illustrated in FIG. 13A has finished being loaded into the magazine holder 3. In this state, the groove part 20D which is provided at the bottom part of the cartridge magazine 2 overlaps the hole 30A of the takeout lock/unlock mechanism 3M of the cartridge magazine which is provided at the horizontal part 30H of the base of the magazine holder 3. This being so, the lock projection 38A can pass through the hole 30A and enter the groove part 20D. By the lock projection 38A entering the groove part 20D, the plate spring 38 also can no longer bend. In this state, the first slide block 35 is still in the unlock position.

FIG. 13C illustrates the state where, in the state of FIG. 13B, the first slide block 35 of the takeout lock/unlock mechanism 3M of the cartridge magazine is made to slide by the hooks of the robot and is positioned directly under the lock projection 38A. In this state, the first slide block 35 can no longer be used to make the front end of the plate spring 38 move, so the plate spring 38 no longer can bend. As a result, the position of the lock projection 38A is held. Even if the cartridge magazine 2 tries to move, it may not move due to the lock projection 38A which has entered the groove 20D. For this reason, the cartridge magazine 2 is locked at this position.

Figure 14A:
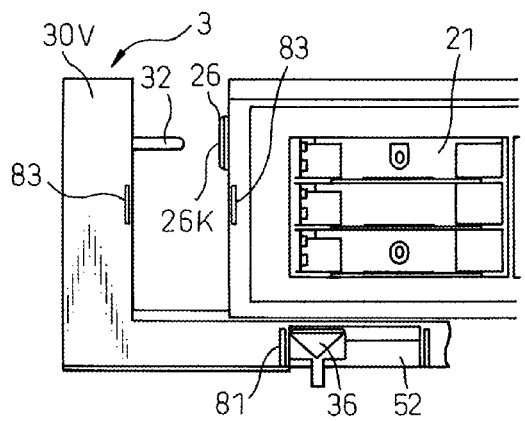
FIG. 14A is a partial enlarged front view which illustrates the state right before the cartridge magazine which is illustrated in FIG. 5A is loaded into the magazine holder which is illustrated in FIG. 10A in the key lock state.
Figure 14B:
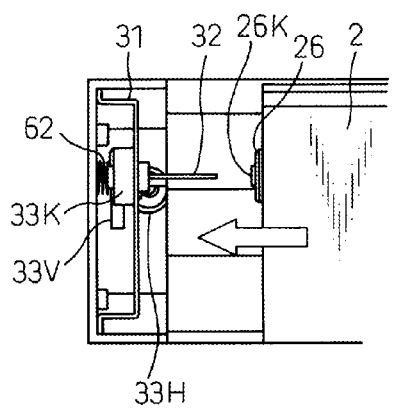
FIG. 14B is a plan view of FIG. 14A.

FIG. 14A shows the state right before the cartridge magazine 2 which is illustrated in FIG. 5A is loaded into the magazine holder 3 which is illustrated in FIG. 10A in a lock state. Further, FIG. 14B illustrates the state of FIG. 14A viewed by a plan view. The cartridge magazine 2 is in a lock state where the cartridge may not be taken out from the cartridge magazine 2, so the key 32 at the vertical part 30V of the base is also in the lock position. This will be understood from the fact that the second slide block 36 which is at the second cutaway part 52 of the base horizontal part 30H is in the lock position (see FIG. 11A).

In this regard, when loading a cartridge magazine 2 into a magazine holder 3, the key 32 which is provided at the magazine holder 3 is inserted into the key insertion hole 26K of the cylinder 26 of the cartridge magazine 2 (see FIG. 9B). At this time, the base part of the key 32 is structured to be slidable as illustrated in FIG. 14B so that the key 32 does not separate from the cartridge magazine 2. That is, the key-use gear 33 which is provided at the base part of the key 32 is biased by the spring 62 to the gear cover 31 side. Even if there is resistance at the time of insertion of the key 32 into the key insertion hole of the cylinder 26, the spring 62 will contract and absorb this. Due to this structure, even if the cartridge magazine 2 varies in position, since the key 32 is biased by the spring 62, the key 32 will never end up in an improper state.

Figure 14C:
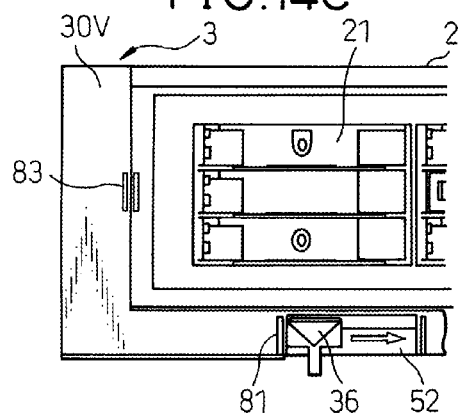
FIG. 14C is a partial enlarged front view which illustrates the state right after the cartridge magazine is further inserted from the state of FIG. 14A and the cartridge magazine finishes being loaded in the magazine holder in the key lock state.
Figure 14D:
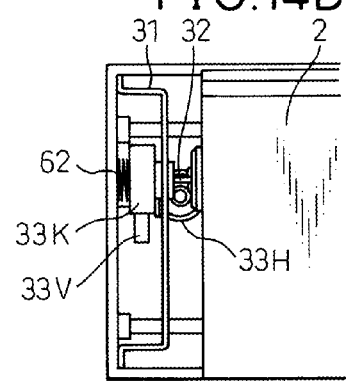
FIG. 14D is a plan view of FIG. 14C.

FIG. 14C illustrates the state right after a cartridge magazine is further inserted from the state of FIG. 14A and the cartridge magazine 2 finishes being loaded into the magazine holder 3 in the lock state. Further, FIG. 14D illustrates the state viewing the state of FIG. 14C by a plan view. In this state, the vertical part 30V of the base and the rectangular flag 83 at the end of the cartridge magazine 2 adjoin each other and the key 32 and the cylinder 26 are in the connected state. Therefore, the key-use gear 33K shifts from the position which is illustrated in FIG. 14B to a state compressing the spring 62.

Figure 14E:
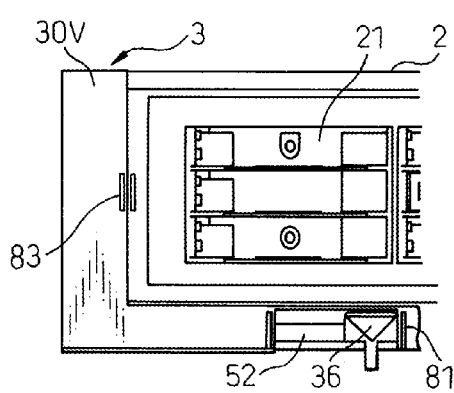
FIG. 14E is a partial enlarged front view which illustrates the state where a second slide block is made to move from the state of FIG. 14C by a robot to an unlock position.
Figure 14F:
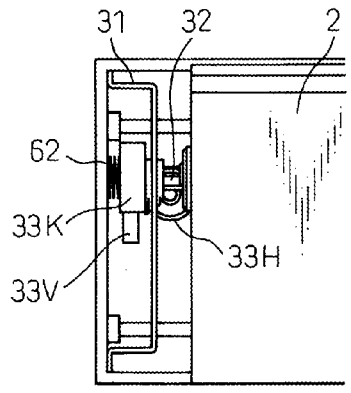
FIG. 14F is a plan view of FIG. 14E.

FIG. 14E illustrates the state where the second slide block 36 is made to slide in the second cutaway part 52 by the robot and is made to slide from the key lock position which is illustrated in FIG. 14 to the unlock position. Further, FIG. 14F illustrates the state of FIG. 14E as viewed from a plan view. The point of the key 32 being slanted differs from FIG. 14D.

Figure 15A:
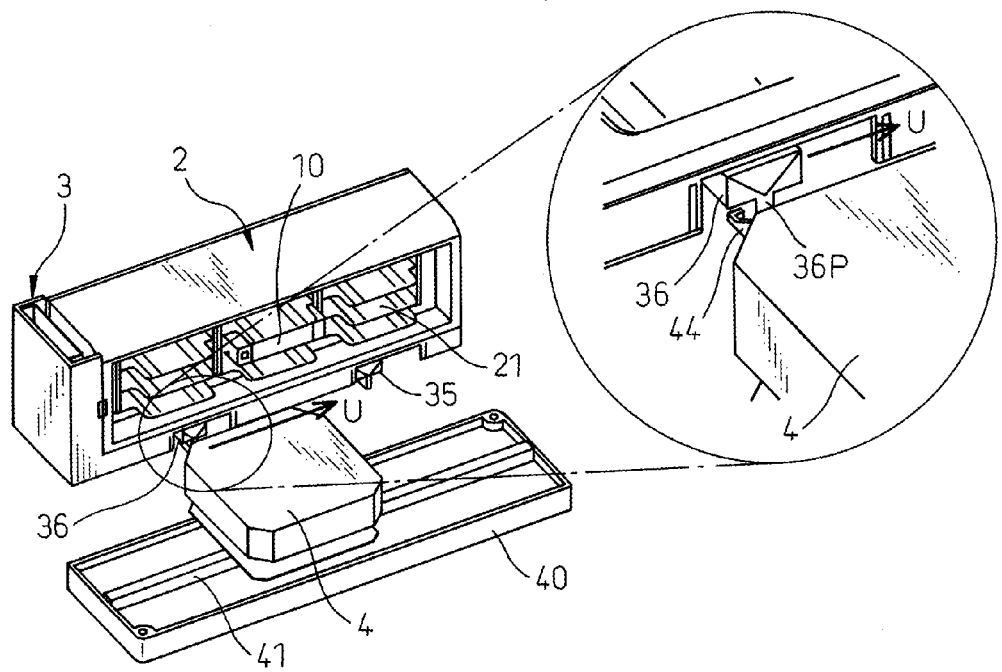
FIG. 15A is a perspective view which explains the operation where the robot which was explained in FIG. 4A uses hooks to make the second slide block move and change the state which is illustrated in FIG. 14C to the state which is illustrated in FIG. 14E and a partial enlarged view of the second block part.
Figure 16A:
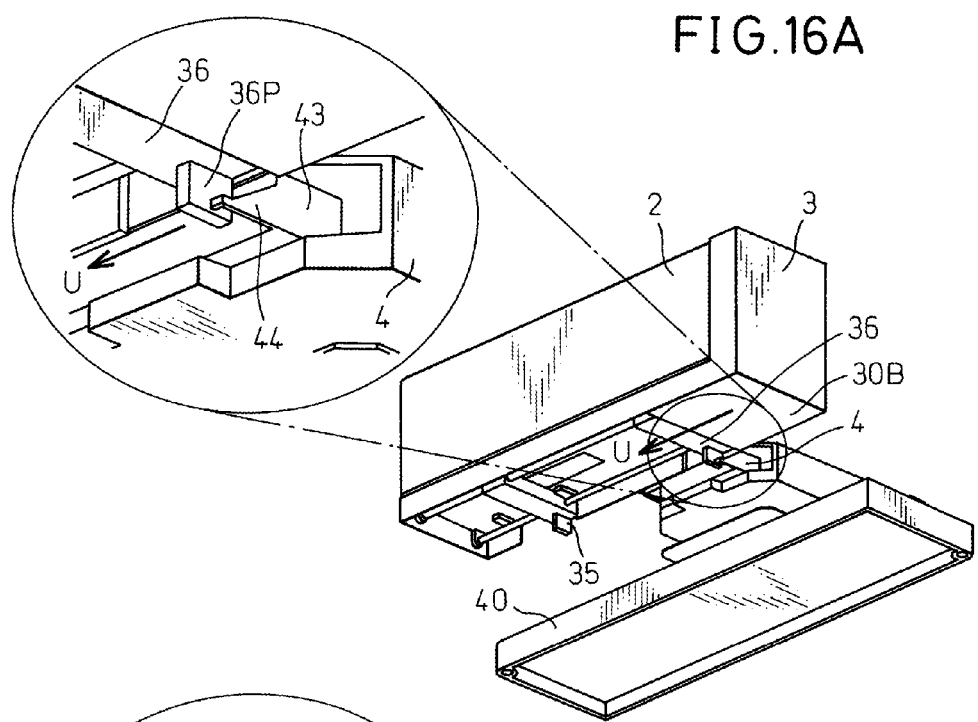
FIG. 16A is a perspective view and a partial enlarged view which view the state of FIG. 15A from below the magazine holder and cartridge magazine.

FIG. 15A and FIG. 16A explain the operation of the robot 4 which is explained in FIG. 4A using the hooks 44 to make the second slide block 36 move in the arrow U direction and change from the state which is illustrated in FIG. 14C to the state which is illustrated in FIG. 14E. FIG. 15A illustrates the operation of the robot 4 as seen obliquely from the top, while FIG. 16A illustrates the operation of the robot 4 as seen obliquely from the bottom. As will be understood from these figures, when the robot 4 changes the second slide block 36 from the key lock state to the unlock state, it uses the bent front ends of the hooks 44 to push the projections 36P which are provided on the bottom surface of the second slide block 36 so as to make the block slide.

Figure 15B:
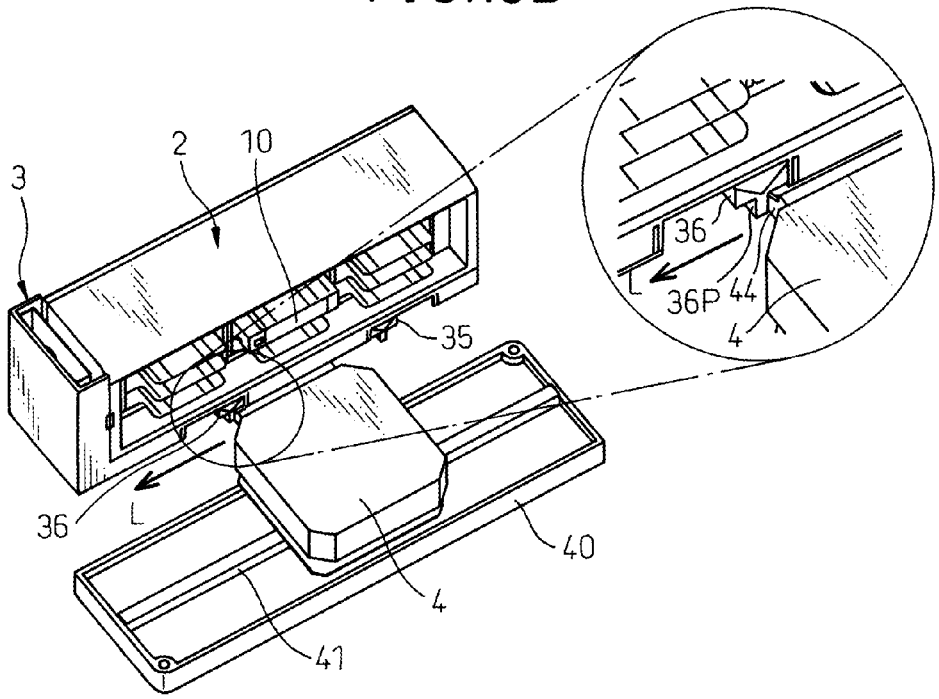
FIG. 15B is a perspective view which explains the operation where the robot which was explained in FIG. 4A uses hooks to make the second slide block move and change the state which is illustrated in FIG. 14E to the state which is illustrated in FIG. 14C and a partial enlarged view of the second block part.
Figure 16B:
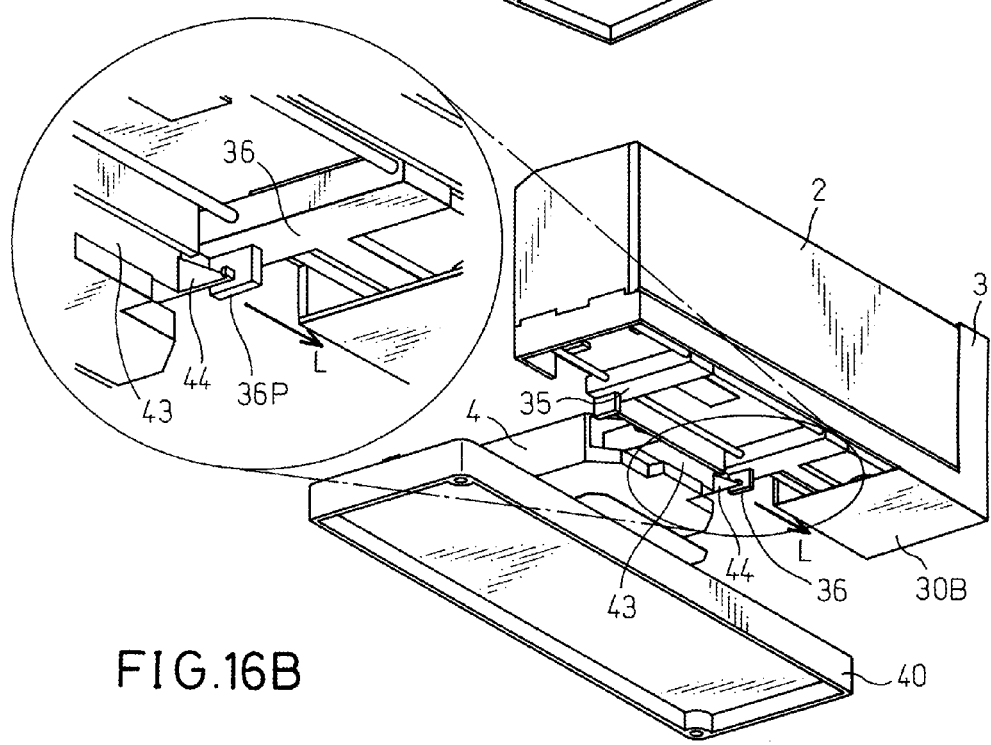
FIG. 16B is a perspective view and a partial enlarged view which view the state of FIG. 15B from below the magazine holder and cartridge magazine.

FIG. 15B and FIG. 16B explain the operation of the robot 4 which is explained in FIG. 4A using the hooks 44 to make the second slide block 36 move in the arrow L direction and return from the state which is illustrated in FIG. 14E to the state which is illustrated in FIG. 14C. FIG. 15B illustrates the operation of the robot 4 as seen obliquely from above, while FIG. 16B illustrates the operation of the robot 4 as seen obliquely from the bottom. As will be understood from these figures, when the robot 4 changes the second slide block 36 from the unlock state to the key lock state, it uses the back surface sides of the bent front ends of the hooks 44 to push the projections 36P which are provided on the bottom surface of the second slide block 36 so as to make the block slide.

In FIGS. 15A, 15B, 16A, and 16B, the operation of the robot 4 making the second slide block 36 slide in the second cutaway part 52 was explained, but the robot 4 can similarly operate to make the first slide block 35 slide in the first cutaway part 51. The operation of making the first slide block 35 slide in the first cutaway part 51 is the same as the operation of making the second slide block 36 slide in the second cutaway part 52, so the explanation will be omitted. In this way, with the magazine holder 3 in the present application, the takeout lock operation which prevents the cartridge magazine 2 from being taken out from the magazine holder 3 and the key lock operation which prevents withdrawal of the cartridge from the cartridge magazine 2 can be performed by an existing robot 4.

FIG. 17 is a flow chart which illustrates the control routine which is performed by the controller 5 which is illustrated in FIG. 2B at the time of ejecting a cartridge magazine 2 from the library system 1. Note that, in the following explanation, figure numbers are not particularly shown, but the explanation will be given while attaching reference notations of the members which were explained up to now from FIG. 1A to FIG. 16B. Further, in FIG. 17, the cartridge magazine 2 is described simply as a "magazine". This control is started by the controller if the operator presses a magazine eject button which is displayed on the operator panel 8 of the library system 1. If it is confirmed at step 1701 that the magazine eject button has been pressed from the operator panel 8, the routine proceeds to step 1702 where the controller 5 is used to display on the operator panel 8 a question inquiring whether to eject the cartridge magazine 2 in the key lock state or eject it in the unlock state.

At the next step 1703, it is judged by the controller 5 if the input of the response to the question which was displayed at the operator panel 8 at step 1702 is a key lock instruction. When the cartridge magazine 2 is loaded in the library system 1, the robot 4 takes out or inserts the cartridge from or to the cartridge magazine 2, so the cartridge magazine 2 is in the unlock state. Therefore, if it is judged at step 1703 that the input is an unlock instruction, the processing of steps 1704 and 1705 is omitted and the processing of step 1706 is performed by the control part 5.

On the other hand, if it is judged at step 1703 that the input is a key lock instruction, the controller 5 is used to perform the processing of step 1704 and step 1705, so the processing of step 1706 is performed. At step 1704, the robot 4 is made to move in front of the second slide block 36. For positioning of the robot 4, the flag 80, 81 are used. At the next step 1705, the robot 4 is used to make the second slide block 36 slide, the cartridge magazine 2 changes from the unlock state to the key lock state, and a cartridge 10 can no longer be taken out from the cartridge magazine 2.

If the processing of steps 1703 to 1705 results in the key lock/unlock state of a cartridge magazine 2 becoming as instructed by the operator, at step 1706, the robot 4 is made to move in front of the first slide block 35 of the cartridge magazine takeout lock/unlock mechanism 3M. For positioning of the robot 4, the flags 80, 81 are used. At the next step 1707, the robot 4 is used to make the first slide block 35 slide and change the cartridge magazine takeout lock/unlock mechanism 3M from the takeout lock state to the unlock position. With this, the cartridge magazine 2 can be taken out from the library system 1.

This being so, the controller 5 displays at step 1708 on the operator panel 8 "cartridge magazine takeout OK". Viewing this display, the operator can take out a cartridge magazine 2 from the library system 1. The next step 1709 judges if a cartridge magazine has been taken out from the library system 1. If at step 1709 the controller 5 may not confirm that a cartridge magazine has been taken out from the library system 1 (NO), the processing of step 1708 is continued and the operator panel 8 continues to display "cartridge magazine takeout OK".

On the other hand, if at step 1709 the controller 5 can confirm that a cartridge magazine has been taken out from the library system 1 (YES), the routine proceeds to step 1710 where the controller 5 is used to display on the operator panel 8 "cartridge magazine takeout completed" and the processing ends.

FIG. 18 is a flow chart which illustrates a control routine which is performed by the controller 5 which is illustrated in FIG. 2B at the time when a cartridge magazine 2 is inserted into the library system 1. Here as well, in the following explanation, while figure numbers are not shown, the explanation will be given while attaching the reference notations to members which were explained from FIG. 1A to FIG. 16B. Further, in FIG. 18, the cartridge magazine 2 is described as just a "magazine". This control is started by the controller 5 when the operator pushes a magazine insert button displayed on the operator panel 8 of the library system 1. If at step 1801 it is confirmed that the magazine insert button has been pressed from the operator panel 8, the controller 5 performs the processing of step 1802. At step 1802, the robot 4 is made to move in front of the first slide block 35, whereupon the states of the flags 80 and 81 are used to confirm of the first slide block 35 is in the takeout lock state.

If the first slide block 35 is not in the takeout lock state (is in unlock state), the controller 5 operates the robot 4 to set the first slide block 35 to the takeout lock state. This processing is because there is a possibility of the key 32 breaking if the cartridge magazine 2 is inserted into the library system 1 in the state where the key lock/unlock states of the cartridge magazine 2 and the key lock/unlock mechanism 3C of the cartridge magazine do not match. That is, this processing is failsafe processing which prevents accidents when a cartridge magazine 2 is inserted into the library system 1 in the unlock state without a response to the inquiry by the operator panel 8 explained later. Due to this processing, in this embodiment, the cartridge magazine 2 may not be inserted into the library system 1 in the state where the key lock/unlock states of the cartridge magazine 2 and the key lock/unlock mechanism 3C of the cartridge magazine are unclear.

If at step 1802 the first slide block 35 is in the takeout lock state, at the next step 1803, the robot 4 is made to move in front of the second slide block 36 of the key lock/unlock mechanism 3C of the cartridge magazine. Further, when the second slide block 36 becomes the key lock position from the state of the flags 80 and 81, the robot 4 does not operate, while when the second slide block 36 is not at the key lock position, the second slide block 36 is made the key lock position. In this way, the second slide block 36 is made the key lock position because a cartridge magazine 2 is often inserted into the library system 1 in a key lock state. When this processing ends, the routine proceeds to step 1804 where the controller 5 is used to display on the operator panel 8 a question which inquires if the inserted cartridge magazine 2 is in the key lock state or unlock state.

At the next step 1805, it is judged by the controller 5 whether the response which is input for the question which was displayed at the operator panel 8 at step 1804 is the key lock state. The key 32 of the key lock/unlock mechanism 3C of the cartridge magazine is already in the key lock state due to the processing of step 1803. Therefore, if the input of the response is the key lock state, the routine proceeds as is to step 1807. Further, if the input of the response is the unlock state, the routine proceeds to step 1806 where the robot 4 is driven to make the second slide block 36 the unlock state and turn the key 32 to the unlock position, then the routine proceeds to step 1807. Due to the processing of steps 1803 to 1806, the key lock/unlock state of the cartridge magazine 2 and the key lock/unlock state of the key 32 of the key lock/unlock mechanism 3C of the cartridge magazine match.

At the next step 1807, the robot 4 is made to move in front of the first slide block 35 and the first slide block 35 which was positioned at the takeout lock position at step 1802 is made to slide from the takeout lock position to the unlock position. With this, the cartridge magazine 2 can be inserted into the library system 1. At the next step 1808, the controller 5 is used to display on the operator panel 8 the fact that the cartridge magazine 2 could be inserted into the library system 1. Viewing this display, if the operator inserts the cartridge magazine 2 in the library system 1, it is loaded into the magazine holder 3 in a state where the cartridge magazine 2 and the key lock/unlock mechanism 3C of the cartridge magazine match in lock/unlock state. As a result, at the time of insertion of a cartridge magazine 2 into the library system 1, the key 32 is correctly inserted into the cartridge magazine 2.

If a cartridge magazine 2 is inserted into the library system 1, the controller 5 confirms at step 1809 if the cartridge magazine 2 has finished being loaded into the magazine holder 3. Further, after it is confirmed that the cartridge magazine 23 has been loaded into the magazine holder 3, at step 1810, the robot 4 is made to move in front of the first slide block 35, and the robot 4 is used to make the first slide block 35 slide to shift from the unlock position to the takeout lock position. With this, the cartridge magazine 2 becomes a state where it may not be taken out from the library system 1, so at step 1811, the controller 5 displays on the operator panel 8 the fact of completion of insertion of the cartridge magazine 2 into the library system 1 and ends the processing.

Note that, the control at the time of ejection of a cartridge magazine 2 from the library system 1 explained above and the control at the time of insertion of a cartridge magazine 2 into the library system 1 are examples. The control to the takeout lock/unlock state of the first slide block 35 and the control to the key lock/unlock state of the second slide block 36 need not be this way. For example, the processing at step 1802 and step 1803 may be made the controller 5 making an inquiry of the key lock/unlock state of the cartridge magazine 2 at the operator panel 8 and operating according to the response at step 1804. Further, as the key 32, it is sufficient to use a theft-prevention key which may not be replicated by a third party and which does not allow the lock to be picked.

According to the cartridge magazine of the present application, if setting the cartridge lock state at the time of taking out a cartridge magazine from the library system, the cartridge is locked inside of the cartridge magazine and can no longer be pulled out from the cartridge magazine, so theft of the cartridge is prevented. Further, according to the library system of the present application, if loading a cartridge magazine in the cartridge lock state into the library system, the lock of the cartridge magazine is automatically disengaged. As a result, inside the library system, a cartridge which is held in the cartridge magazine can be taken out and freely conveyed, so is secure. Furthermore, the lock/unlock operation for taking out a cartridge magazine from inside the library system and the key lock/lock disengagement operation which prevents withdrawal of a cartridge from a cartridge magazine can be performed by an existing robot, so there is no additional cost. Further, regarding the lock/unlock for taking out a cartridge magazine and detection of completion of loading as well, in the past, a solenoid or other drive part or sensor was used, but in the present application, this can be performed by the functions of an existing robot, so the costs can be reduced.

All examples and conditional language recited herein are intended for pedagogical purposes to aid the reader in understanding the invention and the concepts contributed by the inventor to furthering the art and are to be construed as being without limitation to such specifically recited examples and conditions. Nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A cartridge magazine for a library system, comprising:
   a cartridge storage cell assembly which is provided with a plurality of cells which may store cartridges,
   a cartridge lock mechanism which prevents withdrawal of a cartridge which is stored in a cell from the cell,
   a drive mechanism of the cartridge lock mechanism which is provided with a key insertion hole into which a key is to be inserted and which uses rotation of a key which is inserted into the key insertion hole to drive the cartridge lock mechanism, and
   a housing which holds the cartridge storage cell assembly, the cartridge lock mechanism, and the drive mechanism of the cartridge lock mechanism, where,
   in the state where the drive mechanism of the cartridge lock mechanism is held in the housing, the key insertion hole is positioned at the side surface of the housing at the side of insertion into the library system.

2. The cartridge magazine for a library system according to claim 1, wherein the cartridge storage cell assembly comprises a plurality of cell columns, each comprising a predetermined number of cells arranged stacked in a vertical direction, arranged in the horizontal direction.

3. The cartridge magazine for a library system according to claim 1, wherein
   the cartridge lock mechanism has a first lock mechanism which limits movement of a cartridge inside of a cell and a second lock mechanism which may stop operation of the first lock mechanism,
   the first lock mechanism comprises a lock projection which sticks out from a side surface of the cell to be able to advance from and retract into the cell so as to engage with a cartridge and a biasing member which biases the lock projection to be able to advance from and retract into the cell,
   the second lock mechanism comprises a shaft which extends in a longitudinal direction of the cartridge magazine, pinion gears which are attached to the shaft, and rods which are provided with racks which mesh with the pinion gears and which are provided with lock plates which stick out to the cell side, and
   when the drive mechanism of the cartridge lock mechanism is used to drive the second lock mechanism in the lock direction, the lock plates move and the operation of the biasing member is obstructed.

4. The cartridge magazine for a library system according to claim 3, wherein the drive mechanism of the cartridge lock mechanism comprises a power transmission gear which is attached to the shaft, a drive gear which meshes with the power transmission gear, and a cylinder which is provided with the key insertion hole and which is provided integrally with a shaft of the drive gear.

5. The cartridge magazine for a library system according to claim 3, wherein the biasing member is a plate spring.

6. A library system, comprising:
   at least one cartridge magazine which is provided with a plurality of cells which can store cartridges and may be taken out of and inserted into the library system,
   a holder which holds the at least one cartridge magazine in the library system,
   storage cells which may store cartridges in the library system,
   at least one tape drive which reads and writes data to and from magnetic tape in a cartridge,
   a robot which conveys a cartridge among the cartridge magazine, the storage cells, and the at least one tape drive, and
   a controller which controls the operation of the library system,
   the cartridge magazine provided with the a cartridge lock mechanism which uses a key to prevent withdrawal of the stored cartridge,
   the holder being provided with the key which engages with a key insertion hole, and
   the key being driven by the robot which is controlled by the controller.

7. The library system according to claim 6, wherein
   the cartridge magazine comprises a cartridge storage cell assembly which is provided with a plurality of cells which may store cartridges, the cartridge lock mechanism, and a housing which holds the cartridge storage cell assembly and the cartridge lock mechanism,
   the cartridge lock mechanism comprises a first lock mechanism which prevents a cartridge which is stored in a cell from being taken out from the cell and a second lock mechanism which may stop operation of the first lock mechanism,
   a drive mechanism of the second lock mechanism which is provided with the key insertion hole into which the key may be inserted and which uses rotation of the key which is inserted into the key insertion hole to drive the second lock mechanism, and
   in the state where the drive mechanism of the second lock mechanism is held in the housing, the key insertion hole is positioned at the side surface of the housing at the side inserted into the library system.

8. The library system according to claim 7, wherein the cartridge storage cell assembly comprises a plurality of cell columns, each comprising a predetermined number of cells arranged stacked in a vertical direction, arranged in the horizontal direction.

9. The library system according to claim 7, wherein
   the first lock mechanism comprises a lock projection which sticks out from a side surface of the cell to be able to advance from and retract into the cell so as to engage with a cartridge and a biasing member which biases the lock projection to be able to advance from and retract into the cell,
   the second lock mechanism comprises a shaft which extends in a longitudinal direction of the cartridge magazine, pinion gears which are attached to the shaft, and rods which are provided with racks which mesh with the pinion gears and which are provided with lock plates which stick out to the cell side, and
   when the drive mechanism of the second lock mechanism is used to drive the second lock mechanism in the lock direction, the lock plates move and the operation of the biasing member is obstructed.

10. The library system according to claim 9, wherein the drive mechanism of the second lock mechanism comprises a power transmission gear which is attached to the shaft, a drive gear which meshes with the power transmission gear, and a cylinder which is provided with the key insertion hole and which is provided integrally with a shaft of the drive gear.

11. The library system according to claim 9, wherein the biasing member is a plate spring.

12. The library system according to claim 6, wherein the holder comprises a magazine lock mechanism which locks insertion/takeout of a cartridge magazine to and from the library system and the cartridge lock mechanism which controls the operation of the key which engages with the cartridge lock mechanism to key lock the at least one cartridge magazine.

13. The library system according to claim 12, wherein
the magazine lock mechanism comprises
   a lock projection which sticks out from a hole which is provided at a horizontal part of a base which forms the holder,
   a biasing member which biases the lock projection to be able to emerge from and retract into the hole, and
   a first slide block which moves on two parallel shafts by the robot and obstructs operation of the biasing member, and
the cartridge lock mechanism comprises:
   a first bevel gear,
   the key which is provided at a vertical part of the base which forms the holder,
   a key-use gear which is provided coaxially with the key and which makes the key rotate,
   a first gear train with a gear at one end which meshes with the key-use gear and with a gear at the other end which meshes with the first bevel gear,
   a second bevel gear which is provided at the horizontal part of the base and meshes with the first bevel gear,
   a second slide block which moves on two parallel shafts by the robot,
   a rack which is provided at the second slide block, and
   a second gear train with a gear at one end which meshes with the first bevel gear and with a gear at the other end which meshes with the rack.

14. The library system according to claim 13, wherein the first slide block and the second slide block slide move on the same parallel shafts.

15. The library system according to claim 14, wherein the first slide block and the second slide block are formed so as to move back and forth in a cutaway part of a predetermined length which is provided at a side surface of the horizontal part of the base.

16. The library system according to claim 15, wherein
the two sides of the cutaway part and the surfaces of the first slide block and the second slide block at the robot sides are respectively provided with flags, and
the robot detects the positions of the flags so as to perform positioning with respect to the first slide block and the second slide block and detect the takeout lock/unlock state of the first slide block and the key lock/unlock state of the second slide block.

17. The library system according to claim 13, wherein
the surface of the vertical part of the base at the robot side and the surface of the front end of the at least one cartridge magazine at the robot side are provided with flags at the same horizontal position, and
the robot detects the distance between the flags so as to enable the controller to judge completion of loading of the at least one cartridge magazine to the magazine lock mechanism.

18. The library system according to claim 13, wherein the key-use gear is attached through a buffer member to the vertical part of the base and, when the key is engaged with the key insertion hole of the cartridge magazine, the buffer member is made to contract to make the key slide in the axial direction.

19. The library system according to claim 6, wherein the controller ejects the cartridge magazine in either of the key lock state and unlock state in accordance with an instruction from the outside at the time of ejection of the cartridge magazine from the library system.

20. The library system according to claim 6, wherein the controller sets the unlock state after the cartridge magazine is loaded in the library system when inserting the cartridge magazine into the library system and the cartridge magazine is in the key lock state.

* * * * *

UNITED STATES PATENT AND TRADEMARK OFFICE
CERTIFICATE OF CORRECTION

PATENT NO. : 8,675,302 B2  
APPLICATION NO. : 13/560729  
DATED : March 18, 2014  
INVENTOR(S) : Hashimoto Page 1 of 1

It is certified that error appears in the above-identified patent and that said Letters Patent is hereby corrected as shown below:

In the Claims

Column 18, Line 15, In Claim 6, after "provided with" delete "the".

Signed and Sealed this  
Third Day of June, 2014

Michelle K. Lee  
*Deputy Director of the United States Patent and Trademark Office*